(12) United States Patent
Kamijima et al.

(10) Patent No.: US 7,808,742 B2
(45) Date of Patent: Oct. 5, 2010

(54) THIN-FILM MAGNETIC HEAD COMPRISING SHIELD/MAGNETIC-POLE LAYER HAVING SURFACE WITHOUT RIGHT NOR SHARP ANGLE

(75) Inventors: Akifumi Kamijima, Tokyo (JP); Hideyuki Yatsu, Tokyo (JP); Hitoshi Hatate, Tokyo (JP); Hisayoshi Watanabe, Tokyo (JP); Atsushi Yamaguchi, Tokyo (JP); Shingo Miyata, Tokyo (JP); Masahiro Saito, Tokyo (JP)

(73) Assignee: TDK Corporation, Tokyo (JP)

( * ) Notice: Subject to any disclaimer, the term of this patent is extended or adjusted under 35 U.S.C. 154(b) by 635 days.

(21) Appl. No.: 11/781,606

(22) Filed: Jul. 23, 2007

(65) Prior Publication Data

US 2009/0027809 A1 Jan. 29, 2009

(51) Int. Cl.
*G11B 5/31* (2006.01)
(52) U.S. Cl. .................................. 360/125.02
(58) Field of Classification Search ........................ None
See application file for complete search history.

(56) References Cited

U.S. PATENT DOCUMENTS 5,208,715 A * 5/1993 Mowry ........................ 360/319

| | | | |
|---|---|---|---|
| 7,019,944 B2 | 3/2006 | Matono et al. | |
| 2004/0021985 A1* | 2/2004 | Pokhil et al. | 360/126 |
| 2008/0019056 A1* | 1/2008 | Ohta et al. | 360/319 |

FOREIGN PATENT DOCUMENTS

| JP | A 2001-76316 | 3/2001 |
|---|---|---|
| JP | A 2001-256610 | 9/2001 |

OTHER PUBLICATIONS

U.S. Appl. No. 11/774,912, filed Jul. 9, 2007, Naoki Ohta et al.

* cited by examiner

*Primary Examiner*—Mark Blouin
(74) *Attorney, Agent, or Firm*—Oliff & Berridge, PLC

(57) ABSTRACT

Provided is a thin-film magnetic head in which the concentration of magnetic flux in the shield layer and the magnetic pole layer is suppressed. The thin-film magnetic head comprises a plurality of magnetic layers that have front surfaces reaching a head end surface on the ABS side. Further in this head, at least one of the plurality of magnetic layers has a shape in which: each of edges corresponding to both side surfaces extends so as to spread obliquely rearward with each other from an end of a straight edge in a track width direction corresponding to the front surface; and the front surface reaching the head end surface has a shape in which upper and lower corner portions in each of both end portions in the track width direction form obtuse angles or rounded shapes.

30 Claims, 11 Drawing Sheets

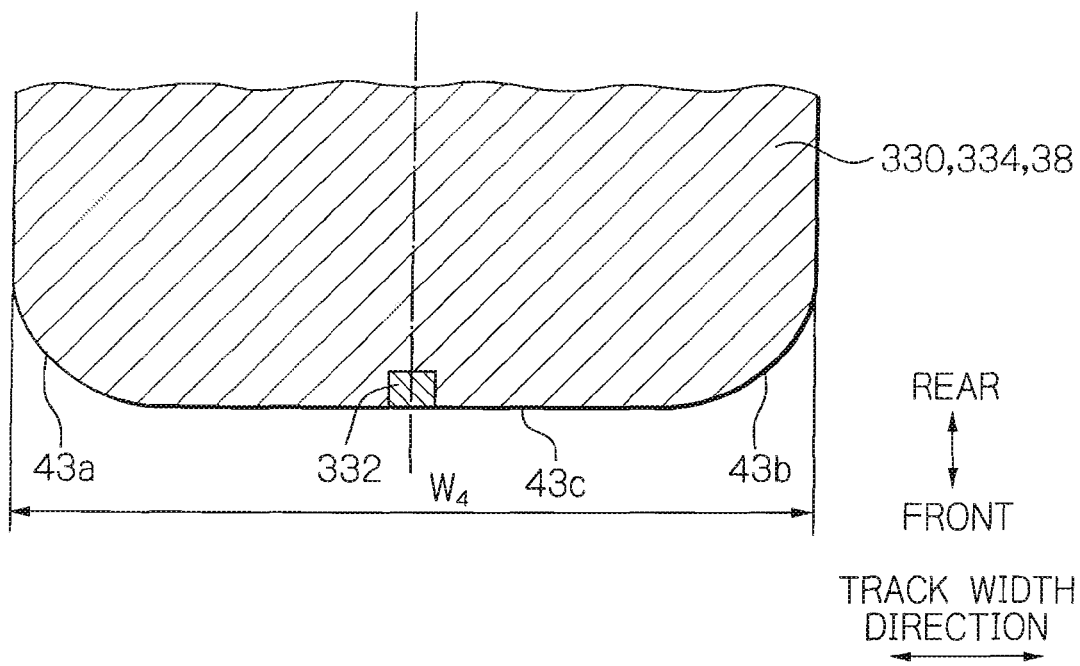
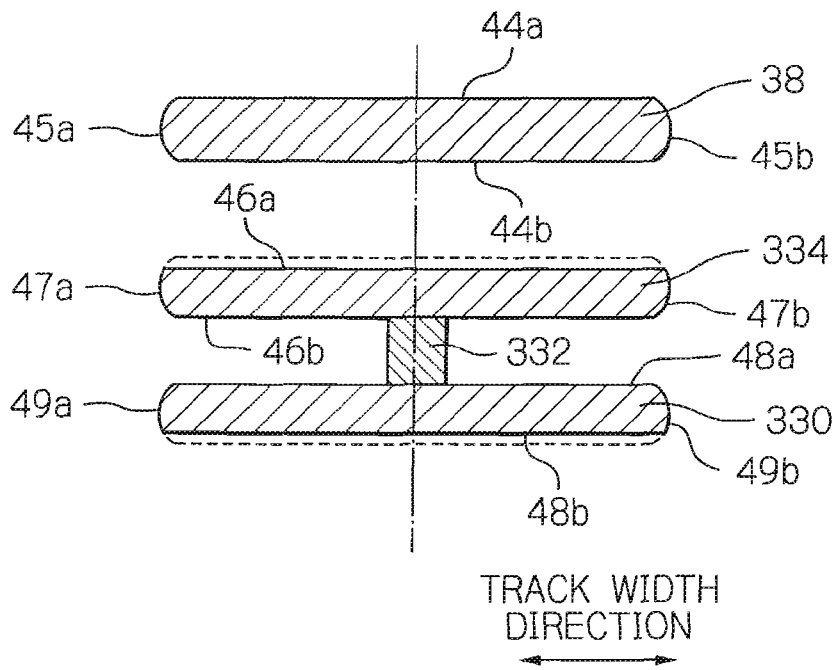

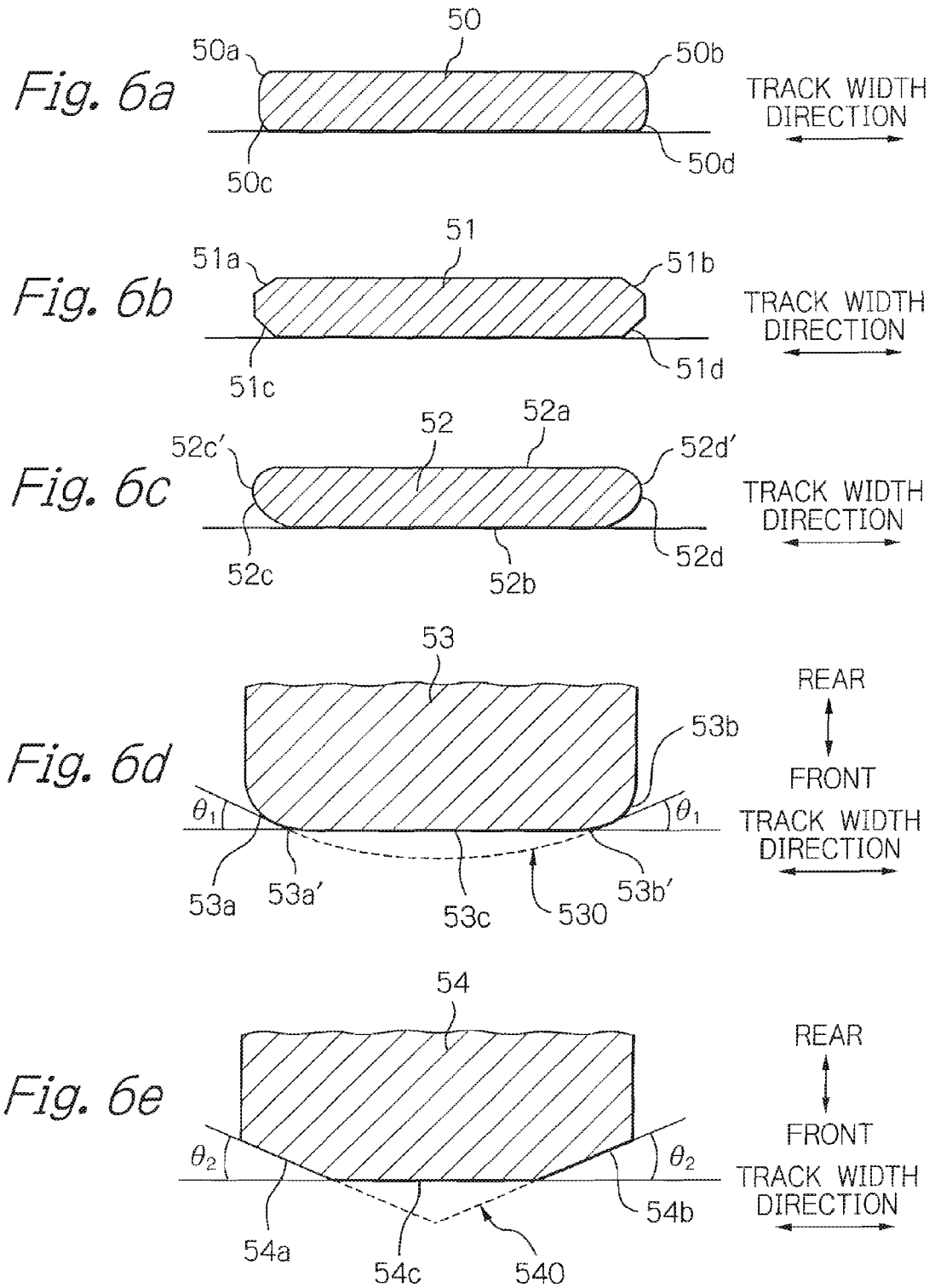

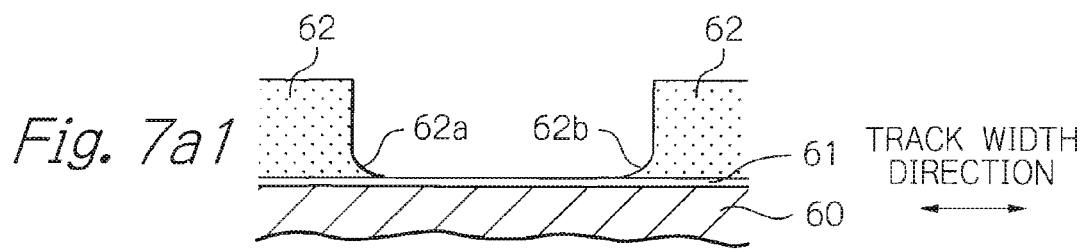
Fig. 7a1
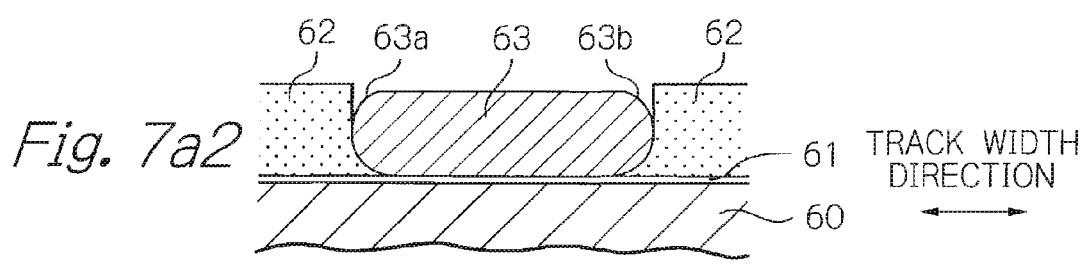
Fig. 7a2
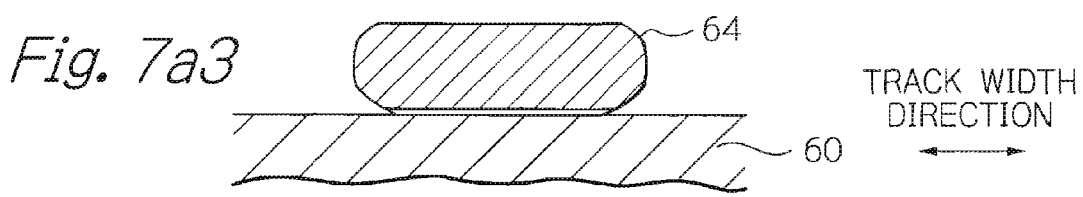
Fig. 7a3
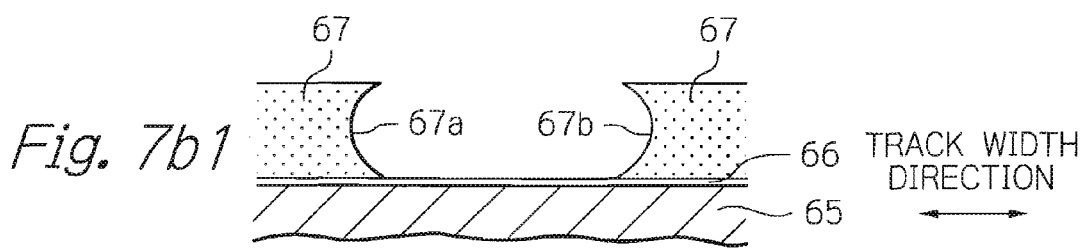
Fig. 7b1
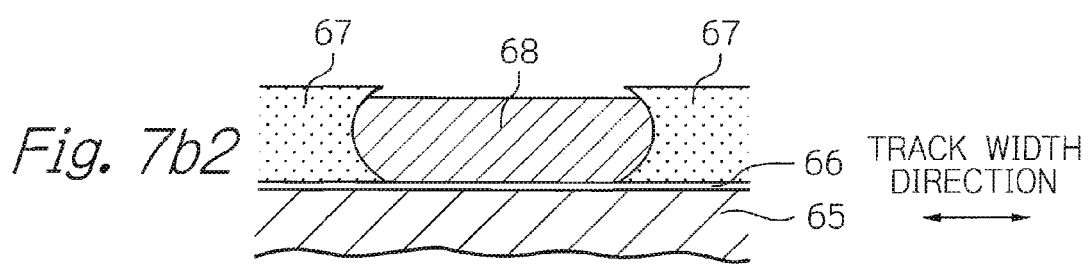
Fig. 7b2
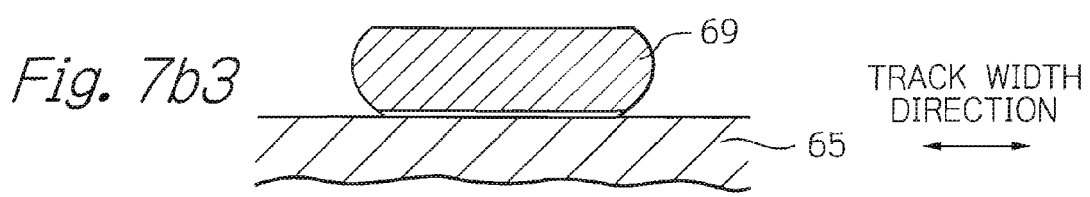
Fig. 7b3

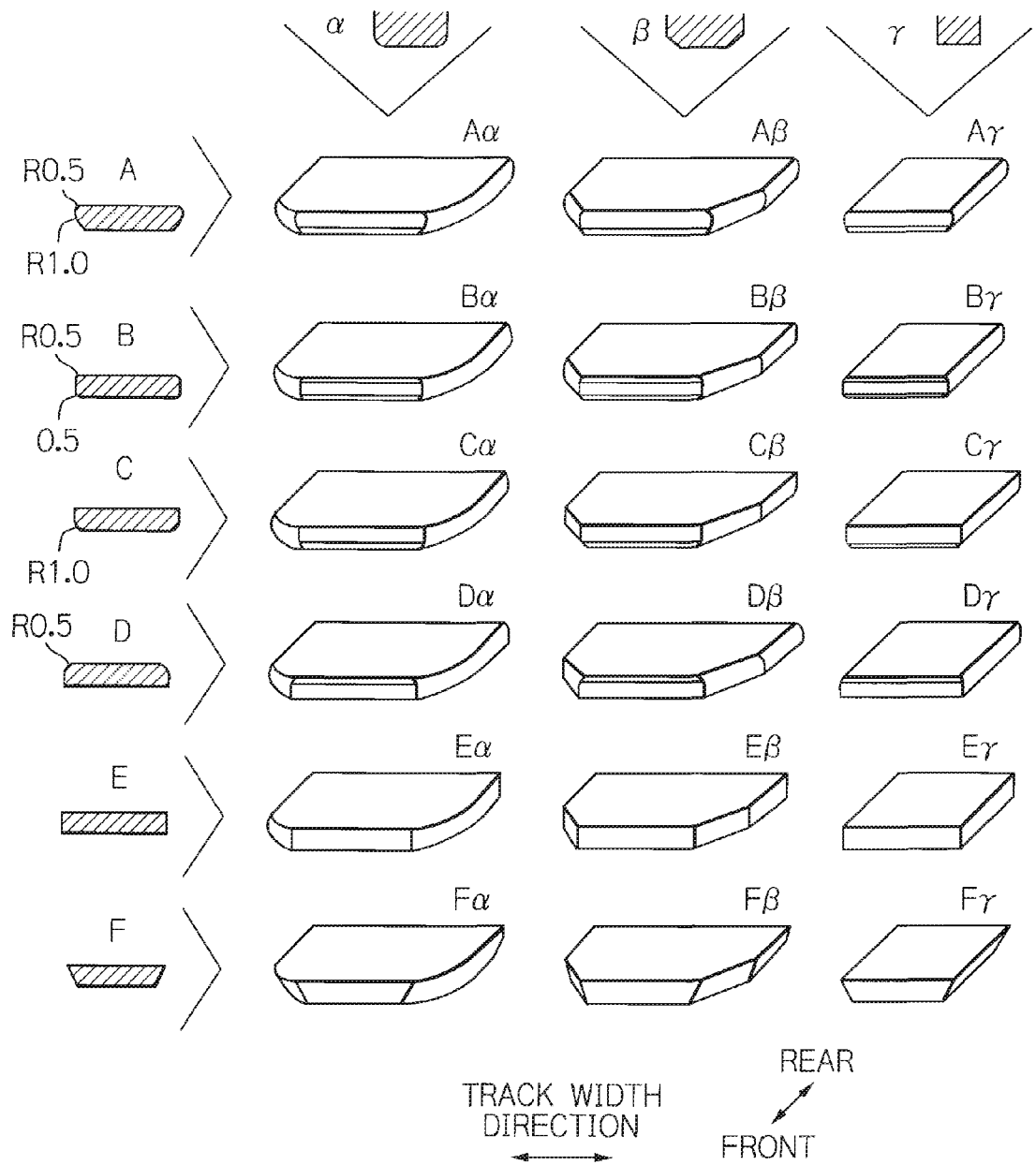

THIN-FILM MAGNETIC HEAD COMPRISING SHIELD/MAGNETIC-POLE LAYER HAVING SURFACE WITHOUT RIGHT NOR SHARP ANGLE

BACKGROUND OF THE INVENTION

1. Field of the Invention

The present invention relates to a thin-film magnetic head for applying to a magnetic recording technique in which the head writes/reads data to/from a magnetic recording medium. The present invention further relates to a head gimbal assembly (HGA) provided with the thin-film magnetic head, and a magnetic recording and reproducing apparatus provided with the HGA.

2. Description of the Related Art

In recent years, perpendicular magnetic recording has been actively developed instead of conventional longitudinal magnetic recording to realize more improvement in areal recording density of magnetic recording and reproducing apparatuses, especially magnetic disk drive apparatuses. In the perpendicular magnetic recording, demagnetization field drastically decreases in a magnetization transition region between record bits written on a magnetic recording medium, and therefore, the magnetization transition width can become much smaller than that of the longitudinal magnetic recording. Furthermore, the record bit formed by the perpendicular magnetic recording is not greatly affected by a thermal fluctuation that becomes serious problem for achieving higher recording density in the longitudinal magnetic recording. As described above, the perpendicular magnetic recording has a potential to realize more stable and higher recording density, and therefore, thin-film magnetic heads for applying to the perpendicular magnetic recording have been developed intensively.

In the thin-film magnetic head for the perpendicular magnetic recording, a shielded pole structure is mainly adopted, which includes a main magnetic pole layer, an auxiliary magnetic pole layer as a return yoke, and a write coil layer for exciting magnetic flux in these magnetic pole layers. Whereas, the corresponding magnetic recording medium mainly has a stacked structure of a soft-magnetic backing layer for acting as a part of magnetic circuit and a perpendicular recording layer. Here, the head flies on the magnetic recording medium with a predetermined spacing (flying height), and performs read and write operations to the magnetic recording medium.

In some cases using this magnetic recording medium, external magnetic field or a write magnetic field (write field) is likely to cause a phenomenon in which unwanted writing or erasing of data occur in positions distant from the track to be written. This phenomenon is thought to be derived from that, under the condition of applying the external magnetic field to the head or of exciting the write field, a rather large loop of magnetic flux may be generated through the soft-magnetic backing layer and the auxiliary magnetic pole layer. The magnetic flux of the generated loop has a tendency to concentrate near both ends of the edge on the air bearing surface (ABS) side of the auxiliary magnetic pole layer, which reaches the head end surface on the ABS side. As a result, magnetic fields generated from the flux-concentrating portions may be likely to cause unwanted writing or erasing. Here, "the head end surface on the ABS side" means an end surface of the head, which exists on the ABS side of the substrate and is opposed to the magnetic recording medium and to which the ends of head elements for reading and writing extend.

Further, a magnetoresistive (MR) element provided in the head for reading data usually has upper and lower shield layers which are formed of magnetic material and sandwich an MR multilayer, which is a magneto-sensitive part, between them. In some cases, the upper and lower shield layers may contribute to the formation of the above-described magnetic flux loop, and magnetic fields generated near both ends of the edges on the ABS side of these shield layers are likely to cause unwanted writing or erasing.

As a magnetic pole layer or a shield layer for contributing to avoiding the unwanted writing or erasing due to the external magnetic field or write field, Japanese Patent Publication No. 2001-76316A discloses the first and second portions of a lower magnetic pole layer, which show rounded corners on the ABS side when viewed from the upper side. Further, Japanese Patent Publication No. 2001-256610A discloses an upper core layer having the end surface with a curved shape directed to the side opposed to the recording medium, in which the curved surface gradually backs away in the height direction as goes closer to both sides in the track width direction. In the above-described shield layer or upper core layer, the reduction of the magnetic flux concentration is anticipated in the rounded corners or the portion with the curved shape.

However, there has been a problem that these prior techniques cannot sufficiently suppress the above-described unwanted writing or erasing, according to the improvement of recording density.

Recently, to improve the sensitivity of magnetic field in the MR element, a current-perpendicular-to-plane giant magnetoresistive (CPP-GMR) element or a tunnel magnetoresistive (TMR) element has been adopted. In these elements, the shield layers also act as electrode layers. That is, upper and lower shield layers (electrode layers) sandwich an MR multilayer and further an insulating layer for preventing short-circuiting of sense current that flows through the multilayer during measuring the resistance change of the multilayer. This sandwich structure causes the considerable amount of stray capacitance. This stray capacitance may be likely to cause a noise in the read output of the MR element; therefore, the area of the upper and lower shield layers is now intended to be set smaller in order to reduce the stray capacitance. However, under the condition that the shield layers have smaller areas, it is difficult to form the above-described rounded corners or the portion with the curved shape, shown in the prior techniques under a sufficiently large size.

Meanwhile, the upper and lower shield layers are becoming thinner along with the improvement of recording density. As the layer thickness of the shield layer becomes smaller compared to the width in the track width direction, the magnetic flux markedly becomes concentrated near both ends of the end surface on the ABS side of the shield layer. Especially, upper and lower shield layers have a tendency toward the flux concentration, which are deposited by using a sputtering method instead of using a plating method and are patterned by using an ion milling method.

FIG. 11 shows a schematic view illustrating an example of the shape on the head end surface on the ABS side of the conventional lower shield layer, which is deposited by using a sputtering method and patterned by using an ion milling method. As shown in the figure, the lower shield layer 80 formed by the above-described methods has a tapered end portion 81 in the track width direction on the head end surface on the ABS side, under the condition of setting the layer thickness to be smaller. Therefore, there has been a problem that a magnetic field that causes unwanted writing or erasing is likely to be generated due to the flux concentration at the tapered end portion 81.

The above-described problem of unwanted writing or erasing due to the flux concentration is surely significant in the case of using the thin-film magnetic head designed for the perpendicular magnetic recording. However, the problem can also be significant in the case of using the thin-film magnetic head for longitudinal magnetic recording, and even in the case, the above-described prior techniques cannot have resolved the problem.

BRIEF SUMMARY OF THE INVENTION

Therefore, an object of the present invention is to provide a thin-film magnetic head in which the concentration of magnetic flux in the shield layer and the magnetic pole layer is suppressed under the condition of higher recording density and thus unwanted writing or erasing is prevented, and is to provide a HGA provided with the thin-film magnetic head and a magnetic recording and reproducing apparatus provided with the HGA.

Before describing the present invention, terms used herein will be defined. In a multilayer structure of element(s) formed on/above the element formation surface of the substrate in a thin-film magnetic head, a layer or a portion of the layer located on the substrate side in relation to a standard layer is referred to as being located "lower" than, "beneath" or "below" the standard layer, and a layer or a portion of the layer located on the stacking direction side (the opposite side to the substrate) in relation to a standard layer is referred to as being located "upper" than, "on" or "above" the standard layer.

In the thin-film magnetic head, the "upper" side corresponds to the trailing side, that is, the downstream side when viewing the movement of the magnetic recording medium to the head as a flow. While the "lower" side corresponds to the leading side, that is, the upstream side when viewing the movement of the magnetic recording medium to the head as a flow.

Further, in the direction perpendicular to the ABS, the direction going from the inside of the head toward the head end surface on the ABS side is referred to as "front", and the direction going from the head end surface on the ABS side toward the inside of the head is referred to as "rear".

Furthermore, a layer surface on the upper side of the layer is referred to as an "upper surface", a layer surface on the lower side is referred to as an "lower surface", a layer surface disposed on the ABS side is referred to as a "front surface", each of two layer surfaces disposed as ends in the track width direction when viewed from the ABS side is referred to as a "side surface", and a layer surface opposite to the front surface is referred to as a "rear surface". Especially, the "front surfaces" of the shield layer and the magnetic pole layer reach the head end surface on the ABS side.

According to the present invention, a thin-film magnetic head is provided, which comprises: a substrate having an ABS; and a plurality of magnetic layers formed on/above an element formation surface of the substrate, each of front surfaces of the plurality of the magnetic layers reaching a head end surface on the ABS side. Further in this head, at least one of the plurality of magnetic layers has a shape in which: each of edges corresponding to both side surfaces, obtained when viewed down from a position directly above the element formation surface, extends so as to spread obliquely rearward with each other from an end of a straight edge in a track width direction corresponding to the front surface; and the front surface reaching the head end surface has a shape in which upper and lower corner portions in each of both end portions in the track width direction form obtuse angles or rounded shapes.

In the above-described thin-film magnetic head according to the present invention, the layer surface near the both ends in the track width direction of at least one of the plurality of magnetic layers, at which the magnetic flux is likely to be concentrated, is set to be a surface without right nor sharp angles. Generally, the degree of the flux concentration on the surface of a magnetic body becomes higher at a corner portion having right or sharp angle. Therefore, it is understood that the above-described surface without right nor sharp angles can suppress the flux concentration, and thus unwanted writing or erasing can be presented.

Here, the "surface without right nor sharp angles" will be explained. If, when going along a path on a surface, there is a discontinuity in the changing slope of the path, the discontinuity point of the path is judged to form an "angle". When any angle on any path becomes obtuse on a surface or there is no angle on any path on a surface, the surface is defined as a "surface without right nor sharp angles".

As an embodiment of the above-described thin-film magnetic head according to the present invention, the thin-film magnetic head preferably comprises: an MR element for reading data, formed on/above the element formation surface of the substrate, and comprising two shield layers provided so as to sandwich an MR multilayer therebetween; and an electromagnetic transducer for writing data, formed on/above the element formation surface of the substrate, and comprising two magnetic pole layers as magnetic paths for guiding a magnetic flux excited by a write current flowing through a write coil layer. Further in this head, each of front surfaces of the two shield layers and the two magnetic pole layers reach the head end surface on the ABS side, and furthermore, at least one of: the two shield layers; and the magnetic pole layer with larger width in the track width direction near the head end surface out of the two magnetic pole layer has a shape in which: each of edges corresponding to both side surfaces, obtained when viewed down from a position directly above the element formation surface, extends so as to spread obliquely rearward with each other from an end of a straight edge in the track width direction corresponding to the front surface; and the front surface reaching the head end surface has a shape in which upper and lower corner portions in each of both end portions in the track width direction form obtuse angles or rounded shapes.

In the just-described thin-film magnetic head, the layer surface near the both ends in the track width direction of at least one of the two shield layers and the magnetic pole layer with larger width in the track width direction, at which the magnetic flux is likely to be concentrated, is set to be a surface without right nor sharp angles. Generally, the degree of the flux concentration on the surface of a magnetic body becomes higher at a corner portion having right or sharp angle. Therefore, it is understood that the above-described surface without right nor sharp angles can suppress the flux concentration, and thus unwanted writing or erasing can be presented.

Further, in the thin-film magnetic head having such a shield layer or magnetic pole layer, the front surface preferably has a shape in which there are an upper straight edge and a lower straight edge and the upper and lower straight edges are connected to each other through their both ends with curve segments which are convexly protruded outward.

Further, in the thin-film magnetic head, a cross-section near the head end surface taken by a plane parallel to the head end surface preferably has a shape in which upper and lower corner portions in each of both end portions in the track width direction form obtuse angles or rounded shapes. Furthermore, it is more preferable that a cross-section near the head end surface taken by a plane parallel to the head end surface has a shape in which there are an upper straight edge and a lower straight edge and the upper and lower straight edges are connected to each other through their both ends with curve segments which are convexly protruded outward. Further, it is also preferable that the front surface has a quadrilateral shape with four rounded corners.

Further, in the thin-film magnetic head having such a shield layer or magnetic pole layer, each of the edges corresponding to both side surfaces extending so as to spread obliquely rearward with each other from an end of the straight edge corresponding to the front surface is preferably a curve segment in which, the more distant from the straight edge a point on the curve segment is, the larger becomes the slope of the curve segment at the point with respect to the straight edge. Or the edges corresponding to both side surfaces extending so as to spread obliquely rearward with each other from an end of the straight edge corresponding to the front surface is also preferably a straight line segment.

Further, in the thin-film magnetic head having such a shield layer or magnetic pole layer, at least one of the two shield layers preferably has a shape in which: each of edges corresponding to both side surfaces, obtained when viewed down from a position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and further in each of the two shield layers, the front surface reaching the head end surface and a surface that is parallel to the element formation surface and is on the side sandwiching the MR multilayer preferably form right or substantially right angle.

By forming this right or substantially right angle, a read gap on the head end surface can be clearly determined, and the MR element can realize the intended resolution of data. Here, "substantially right angle" means an angle of the case in which the corner portion becomes round or the adjacent surfaces form an angle deviated from just right angle inevitably due to the formation process of the layer.

Further, in the thin-film magnetic head having such a shield layer or magnetic pole layer, the magnetic pole layer with larger width in the track width direction preferably has a shape in which: each of edges corresponding to both side surfaces, obtained when viewed down from a position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and further in the magnetic pole layer with larger width in the track width direction, the front surface reaching the head end surface and a surface parallel to the element formation surface and on the side opposed to the other magnetic pole layer preferably form right or substantially right angle.

By forming this right or substantially right angle, a write gap on the head end surface can be clearly determined, and the trailing shield portion 3450 can bring out the intended effect of shunting the magnetic flux spread from the main magnetic pole layer.

According to the present invention, an HGA is further provided, which comprises: the above-described thin-film magnetic head and a support means for supporting the thin-film magnetic head.

According to the present invention, a magnetic recording and reproducing apparatus is further provided, which comprises: at least one HGA described above; at least one magnetic recording medium; and a recording/reproducing means for controlling read and write operations of the thin-film magnetic head to the at least one magnetic recording medium.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIG. 4a shows a top view, obtained when viewed down from the position directly above the element formation surface, schematically illustrating positions and shapes of the upper and lower shield layers and the inter-element shield layer of the MR element;

FIG. 4b shows a side view, obtained when viewed from the ABS side, schematically illustrating positions and shapes of the upper and lower shield layers and the inter-element shield layer which appear on the head end surface;

FIGS. 6a to 6c show side views, obtained when viewed from the ABS side, illustrating various alternatives with respect to the shape appearing on the head end surface in the upper and lower shield layers, the inter-element shield layer, and the auxiliary magnetic pole layer of the thin-film magnetic head according to the present invention;

FIGS. 6d and 6e show top views, obtained when viewed down from the position directly above the element formation surface, schematically illustrating various alternatives with respect to the upper and lower shield layers, the inter-element shield layer, the main magnetic pole layer, and the auxiliary magnetic pole layer of the thin-film magnetic head according to the present invention;

FIG. 7a1 to 7a3 show cross-sectional views for explaining the forming method of the layer having a cross-section shape with rounded upper and lower corner portions;

FIG. 7b1 to 7b3 show cross-sectional views for explaining the forming method of the layer having a cross-section shape with rounded upper and lower corner portions;

FIG. 9 shows perspective views illustrating the shapes of the lower shield layers in head samples Aα to Fγ used for practical and comparative examples;

DETAILED DESCRIPTION OF THE INVENTION

Figure 1:
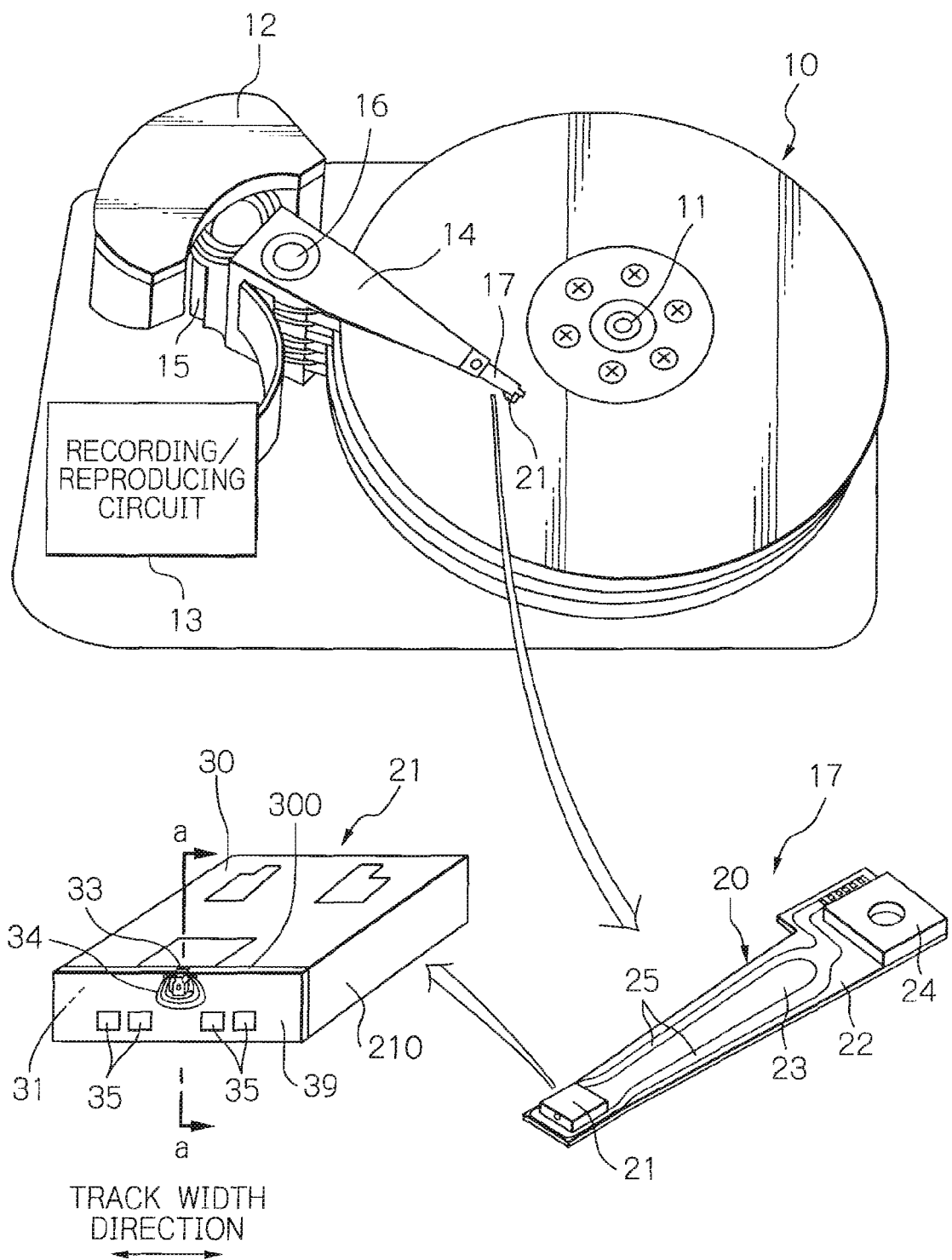
FIG. 1 shows perspective views schematically illustrating configurations of one embodiments of a magnetic recording and reproducing apparatus, an HGA and a thin-film magnetic head according to the present invention.

FIG. 1 shows perspective views schematically illustrating configurations of one embodiments of a magnetic recording and reproducing apparatus, an HGA and a thin-film magnetic head according to the present invention. In magnified views of the HGA and the thin-film magnetic head of FIG. 1, the side opposed to a magnetic disk is turned upward.

The magnetic recording and reproducing apparatus shown in FIG. 1 is a magnetic disk drive apparatus, which includes: multiple magnetic disks 10 as magnetic recording media which rotate about a spindle of a spindle motor 11; an assembly carriage device 12 provided with multiple drive arms 14; HGAs 17 each of which is attached on the end portion of each drive arm 14 and is provided with a thin-film magnetic head (slider) 21; and a recording/reproducing circuit 13 for controlling read/write operations.

The magnetic disk 10 is designed for perpendicular magnetic recording, and has a stacked structure including a soft-magnetic backing layer for acting as a part of magnetic circuit and a magnetic recording layer, which are formed on/above a disk substrate. The magnetic disk 10 may be designed for longitudinal magnetic recording, according to the used thin-film magnetic head. The assembly carriage device 12 is provided for positioning the thin-film magnetic head 21 above a track formed on the magnetic recording layer of the magnetic disk 10. In the device 12, the drive arms 14 are stacked along a pivot bearing axis 16 and are capable of angular-pivoting about the axis 16 driven by a voice coil motor (VCM) 15. Two HGAs 17 and two drive arms 14 may be provided so as to pinch each of the magnetic disk 10. Further, between two magnetic disks 10, one drive arm 14 may be provided so as to support two HGAs 17 disposed for respective magnetic disks 10. Furthermore, the numbers of magnetic disks 10, drive arms 14, HGAs 17, and sliders 21 may be a single.

While not shown in the figure, the recording/reproducing circuit 13 includes: a recording/reproducing control LSI; a write gate for receiving data to be recorded from the recording/reproducing control LSI; an write circuit for outputting a signal from the write gate to an electromagnetic transducer for writing data; a constant current circuit for supplying a sense current to an MR element for reading data; an amplifier for amplifying output voltage from the MR element; and a demodulator circuit for demodulating the amplified output voltage and outputting reproduced data to the recording/reproducing control LSI.

Also as shown in FIG. 1, in the HGA 17, the thin-film magnetic head 21 is fixed and supported on the end portion of a suspension 20 in such a way to face the surface of each magnetic disk 10 with a predetermined spacing (flying height). And one end of a wiring member 25 is electrically connected to electrodes of the thin-film magnetic head 21.

The suspension 20 includes: a load beam 22; an flexure 23 with elasticity fixed on the load beam 22, on which the thin-film magnetic head 21 is fixed to increase its degree of freedom; and a base plate 24 provided on the base portion of the load beam 22. Further, on the flexure 23, provided is a wiring member 25 that consists of lead conductors as signal lines and connection pads electrically connected to both ends of the lead conductors. While not shown in the figure, a head drive IC chip may be attached at some midpoints of the suspension 20.

Also as shown in FIG. 1, the thin-film magnetic head 21 includes: a slider substrate 210 having an air bearing surface (ABS) 30 processed so as to provide an appropriate flying height and an element formation surface 31, and formed of a ceramic material such as AlTiC ($Al_2O_3$—TiC); an MR element 33 as a read head element for reading data and an electromagnetic transducer 34 as a write head element for writing data, which are formed on/above the element formation surface 31; an overcoat layer 39 formed so as to cover the MR element 33 and the electromagnetic transducer 34; and four signal electrodes 35 exposed in the upper surface of the overcoat layer 39. Here, the ABS 30 is opposed to the magnetic disk 10. And respective two of the four signal electrodes 35 are connected to the MR element 33 and the electromagnetic transducer 34.

One ends of the MR element 33 and the electromagnetic transducer 34 reach the head end surface 300 on the ABS 30 side. These ends face the surface of the magnetic disk 10, and then, a read operation is performed by sensing a signal magnetic field from the disk 10, and a write operation is performed by applying a write magnetic field to the disk 10. A predetermined area of the head end surface 300 which these ends reach may be coated with diamond like carbon (DLC), etc. as an extremely thin protective film. Therefore, the meaning that one end of an element "reaches" the head end surface 300 implies the case that the outer surface of the protective film becomes the end surface 300 in a precise sense, and thus, the one end of the element is not exposed from the outer surface.

Figure 2:
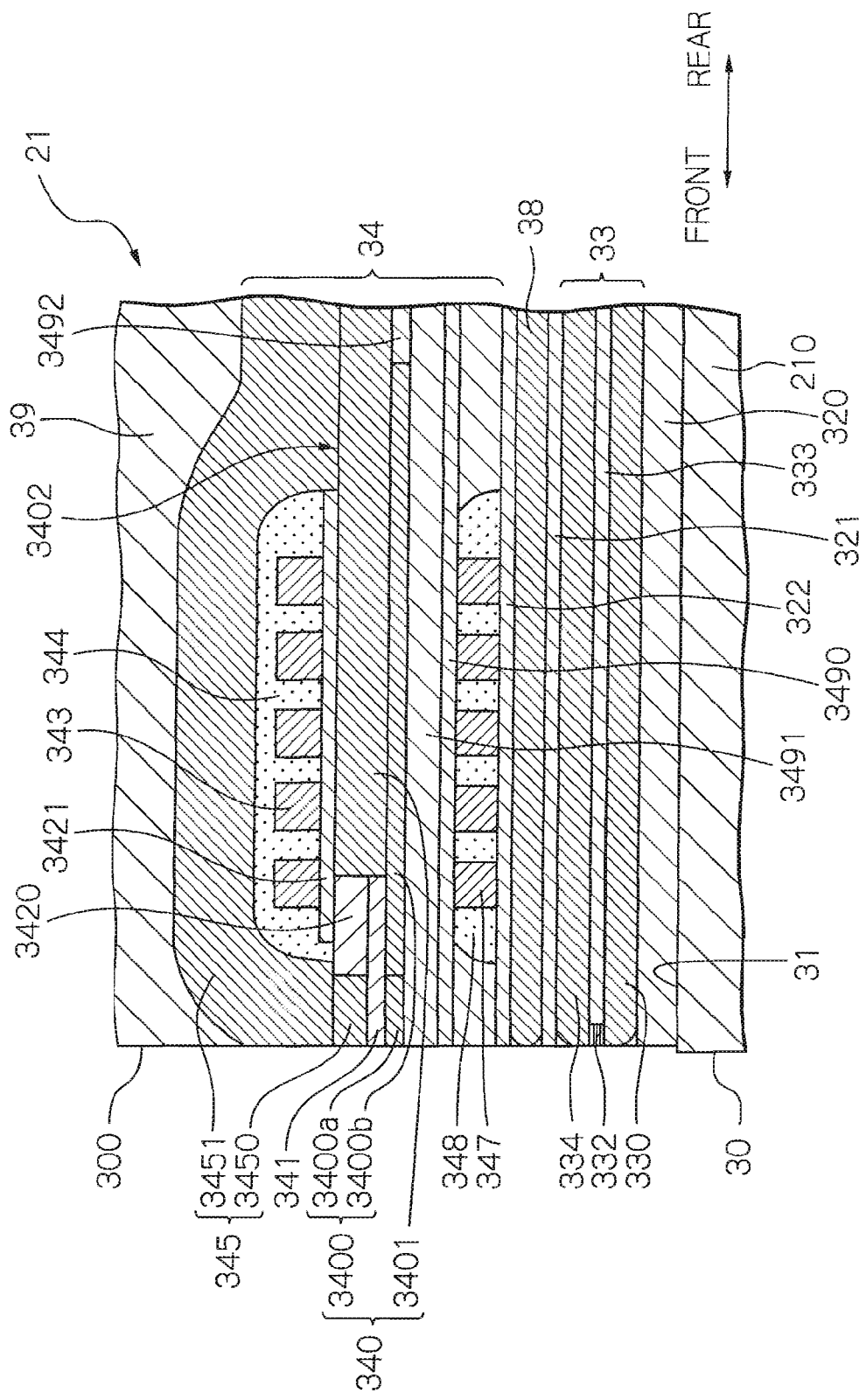
FIG. 2 shows a cross-sectional view taken along line a-a in FIG. 1, schematically illustrating a main portion of the thin-film magnetic head.

FIG. 2 shows a cross-sectional view taken along line a-a in FIG. 1, schematically illustrating a main portion of the thin-film magnetic head 21.

In FIG. 2, the MR element 33 is a tunnel magnetoresistive (TMR) element, a current-perpendicular-to-plane giant magnetoresistive (CPP-GMR) element, or a current-in-plane giant magnetoresistive (CIP-GMR) element, and is formed through an insulating layer 320 made of an insulating material such as $Al_2O_3$ (alumina) on the element formation surface 31 of the slider substrate 210. The MR element 33 includes: an MR multilayer 332; a shield gap layer 333 formed of an insulating material such as $Al_2O_3$ (alumina) and covering at least the rear side surface of the MR multilayer 332; and a lower shield layer 330 and an upper shield layer 334 which sandwich the MR multilayer 332 and the shield gap layer 333 therebetween. The MR multilayer 332 is a magneto-sensitive portion for sensing a signal magnetic field from the magnetic disk with very high sensitivity and making an output in the form of the change in electrical resistance (the change in voltage).

The upper and lower shield layers 334 and 330 are formed of soft-magnetic conductive materials containing such as NiFe (Permalloy), CoFeNi (alloy of cobalt, iron and nickel), CoFe (alloy of cobalt and iron), FeN (iron nitride) or FeZrN (iron zirconium nitride) with a thickness of approximately 0.3 to 5 μm (micrometers), and act as electrodes to apply a sense current in the direction perpendicular to the stacked surface of the MR multilayer 332, as well as play a role of shielding external magnetic field that cause a noise for the MR multilayer 332.

In the upper and lower shield layers 334 and 330 according to the present embodiment, each of edges (43a and 43b in FIG. 4a), corresponding to both side surfaces, obtained when viewed down from the position directly above the element formation surface 31, extends so as to spread obliquely rearward with each other from the end of straight edge in the track width direction (43c in FIG. 4a) corresponding to the front surface reaching the head end surface 300, as described in detail later by using FIGS. 4a and 4b and FIGS. 6a to 6e. Further, the front surface that reaches the head end surface 300 has a shape in which upper and lower corner portions in each of both end portions in the track width direction form obtuse angles (the shape of layer 51 in FIG. 6b) or rounded shapes (the shapes of layers 330 and 334 in FIG. 4b or the shape of layer 50 in FIG. 6a). In FIG. 2, the just-described shape is reflected on rounded corner portions on the opposite side to the MR multilayer 332 of the upper and lower shield layers 334 and 330. Further, the cross-section near the head end surface 300 taken by a plane parallel to the head end surface 300 has a shape in which the upper and lower corner portions in each of both end portions in the track width direction form obtuse angles or rounded shapes. These shapes of the upper and lower shield layers 334 and 330 enable the concentration of magnetic flux in these layers to be suppressed, to prevent the unwanted writing or erasing. As described in detail later, the upper and lower shield layers 334 and 330 are preferably formed by using a frame plating method to obtain these shapes.

The MR multilayer 332 includes: an antiferromagnetic layer formed of an antiferromagnetic material; a pinned layer formed mainly of a ferromagnetic material; a non-magnetic intermediate layer formed of an oxide (in the case of TMR element) or of a non-magnetic metal (in the case of CPP-GMR or CIP-GMR element); and a free layer formed of a ferromagnetic material. In the case of using the TMR element, the magnetizations of the pinned layer and the free layer make a ferromagnetic tunnel coupling with the non-magnetic intermediate layer as a barrier of tunnel effect. Thus, when the magnetization direction of the free layer changes in response to a signal magnetic field, a tunnel current increases/decreases due to the variation in the state densities of up and down spin bands of conduction electrons in the pinned layer and the free layer, which changes the electric resistance of the MR multilayer 332. The measurement of this resistance change enables a weak and local signal field to be detected with high sensitivity.

In the case that the MR element 33 is a CIP-GMR element, shield gap layers are provided between the MR multilayer 332 and respective upper and lower shield layers 334 and 330, and further, element lead conductor layers are formed of a conductive material for supplying the MR multilayer 332 with a sense current.

Also as shown in FIG. 2, the electromagnetic transducer 34 is designed for perpendicular magnetic recording in the present embodiment, and includes: a backing coil layer 347, a main magnetic pole layer 340; a gap layer 341; a write coil layer 343; and an auxiliary magnetic pole layer 345.

The main magnetic pole layer 340 is provided on an insulating layer 3491 formed of an insulating material such as $Al_2O_3$ (alumina), and is a magnetic path for converging and guiding a magnetic flux excited by a write current flowing through the write coil layer 343 toward the magnetic recording layer of the magnetic disk 10. The main magnetic pole layer 340 has a double-layered structure in which a main magnetic pole 3400 and a main pole body 3401 are stacked sequentially and magnetically connected with each other. The main magnetic pole 3400 is isolated by being surrounded with an insulating layer 3491 formed of insulating material such as $Al_2O_3$. The main magnetic pole 3400 reaches the head end surface 300, and has: a main pole front end 3400a with a very small width in the track width direction; and a main pole rear end 3400b located at the rear of the main pole front end 3400a and having a width in the track width direction larger than that of the main pole front end 3400a. Here, the very small width of the main pole front end 3400a determines the width of the track formed on the magnetic recording layer. Thus, the very small width enables a fine write field to be generated, so that the track width can be set to be a very small value adequate for higher recording density.

The main magnetic pole 3400 is formed of a soft-magnetic material with saturation magnetic flux density higher than that of the main pole body 3401, which is, for example, an iron alloy with Fe as a main component, such as FeNi (Iron nickel alloy), FeCo (iron cobalt alloy), FeCoNi (iron cobalt nickel alloy), FeN (iron nitride) or FeZrN (iron zirconium nitride). The thickness of the main magnetic pole 3400 is, for example, in the range of approximately 0.2 to 0.5 μm.

The gap layer 341 is a gap provided for separating the main magnetic pole layer 340 from the auxiliary magnetic pole layer 345 in the region near the head end surface 300. The gap layer 341 is formed, for example, of a non-magnetic insulating material such as $Al_2O_3$ (alumina), $SiO_2$ (silicon dioxide), AlN (aluminum nitride) or DLC, or of a non-magnetic conductive material such as Ru (ruthenium), with a thickness of approximately 0.01 to 0.1 μm.

The write coil layer 343 is formed on a insulating layer 3421 made of an insulating material such as $Al_2O_3$ (alumina), in such a way to pass through in one turn at least between the main magnetic pole layer 340 and the auxiliary magnetic pole layer 345, and has a spiral structure with a back contact portion 3402 as a center. The write coil layer 343 is formed of a conductive material such as Cu (copper), and has a thickness of, for example, approximately 0.3 to 5 μm. The write coil layer 343 is covered with a write coil insulating layer 344 that is formed of an insulating material such as a heat-cured photoresist and electrically isolates the write coil layer 343 from the main magnetic pole layer 340 and the auxiliary magnetic pole layer 345.

The write coil layer 343 has a monolayer structure in the present embodiment, however, may have a two or more layered structure or a helical coil shape. Further, the number of turns of the write coil layer 343 is not limited to that shown in FIG. 2, and may be, for example, in the range from two to seven.

The auxiliary magnetic pole layer 345 reaches the head end surface 300, and includes: a trailing shield portion 3450 for receiving the magnetic flux spreading from the main magnetic pole layer 340; and a yoke portion 3451 that reaches the head end surface 300, and is magnetically connected with the trailing shield portion 3450, and acts as a magnetic path for the magnetic flux that returns from the soft-magnetic backing layer of the magnetic disk 10. The auxiliary magnetic pole layer 345 is formed of a soft-magnetic material, and especially, the trailing shield portion 3450 is formed of a material with high saturation magnetic flux density, such as NiFe (Permalloy) or an iron alloy as the main magnetic pole 3400 is formed of.

Also in the auxiliary magnetic pole layer 345, each of edges (40a and 40b in FIG. 3a) corresponding to both side surfaces, obtained when viewed down from the position directly above the element formation surface 31, extends so as to spread obliquely rearward with each other from the end of straight edge in the track width direction (40c in FIG. 3a) corresponding to the front surface reaching the head end surface 300, as described in detail later by using FIGS. 3a and 3b and FIGS. 6a to 6e. Further, the front surface that reaches the head end surface 300 has a shape in which upper and lower corner portions in each of both end portions in the track width direction form obtuse angles (the shape of layer 51 in FIG. 6b) or rounded shapes (the shape of layer 345 in FIG. 3b or the shape of layer 50 in FIG. 6a). In FIG. 2, the just-described shape is reflected on a rounded upper corner portion of the end portion on the head end surface 300 side of the auxiliary magnetic pole layer 345. Further, the cross-section near the head end surface 300 taken by a plane parallel to the head end surface 300 has a shape in which the upper and lower corner portions in each of both end portions in the track width direction form obtuse angles or rounded shapes. This shape of the auxiliary magnetic pole layer 345 enables the concentration of magnetic flux in the layer to be suppressed, to prevent the unwanted writing or erasing. As described in detail later, the auxiliary magnetic pole layer 345 is preferably formed by using a frame plating method to obtain this shape.

The trailing shield portion 3450 according to the present invention is planarized together with an insulating layer 3420 and the main pole body 3401, and has a width in the track width direction larger than the width of the main pole rear end 3400b and the main pole body 3401 as well as the main pole front end 3400a. This trailing shield portion 3450 causes the magnetic field gradient between the end portion of the trailing shield portion 3450 and the main pole front end 3400a to be steeper. As a result, a jitter of signal output becomes smaller, and therefore, an error rate during reading operation can be reduced.

The backing coil layer 347 is a coil for negating a magnetic flux loop that is derived from the write current applied to the write coil layer 343 of the electromagnetic transducer 34 and passes through the upper and lower shield layers 334 and 330 of the MR element 33. That is, the backing coil layer 347 is provided for suppressing unwanted writing or erasing operation by generating a magnetic flux to negate the above-described magnetic flux loop. Here, in the present case that the upper and lower shield layers 334 and 330 have the above-described shapes by which the flux concentration is suppressed and thus unwanted writing or erasing is prevented, the backing coil layer 347 supports the function of the shapes. The backing coil layer 347 has a spiral structure with a back contact portion 3402 as a center, and is set so that the write current flows in the direction opposite to that in the write coil layer 343. The backing coil layer 347 has a monolayer structure in the present embodiment, however, may have a two or more layered structure or a helical coil shape. Further, the number of turns of the backing coil layer 347 is not limited to that shown in FIG. 2, and may be, for example, in the range from two to seven in accordance with the number of turns of the write coil layer 343.

Further, in the present embodiment, an inter-element shield layer 38 is provided between the MR element 33 and the electromagnetic transducer 34, sandwiched by the insulating layers 321 and 322. The inter-element shield layer 38 plays a role for shielding the MR element 33 from the magnetic field generated from the electromagnetic transducer 34, and may be formed of the same soft-magnetic material as the upper and lower shield layers 334 and 330, and the thickness of the layer 38 is, for example, in the range of approximately 0.5 to 5 μm.

In the inter-element shield layer 38 according to the present invention, each of edges corresponding to both side surfaces, obtained when viewed down from the position directly above the element formation surface 31, extends so as to spread obliquely rearward with each other from the end of straight edge in the track width direction corresponding to the front surface reaching the head end surface 300 (though not shown in FIG. 2), as described in detail later. Further, the front surface that reaches the head end surface 300 has a shape in which upper and lower corner portions in each of both end portions in the track width direction form obtuse angles or rounded shapes. In FIG. 2, the just-described shape is reflected on rounded upper and lower corner portions of the end portion on the head end surface 300 side of the inter-element shield layer 38. Further, the cross-section near the head end surface 300 taken by a plane parallel to the head end surface 300 has a shape in which the upper and lower corner portions in each of both end portions in the track width direction form obtuse angles or rounded shapes. This shape of the inter-element shield layer 38 enables the concentration of magnetic flux in the layer to be suppressed, to prevent the unwanted writing or erasing. As described in detail later, the inter-element shield layer 38 is preferably formed by using a frame plating method to obtain this shape.

Figure 3A:
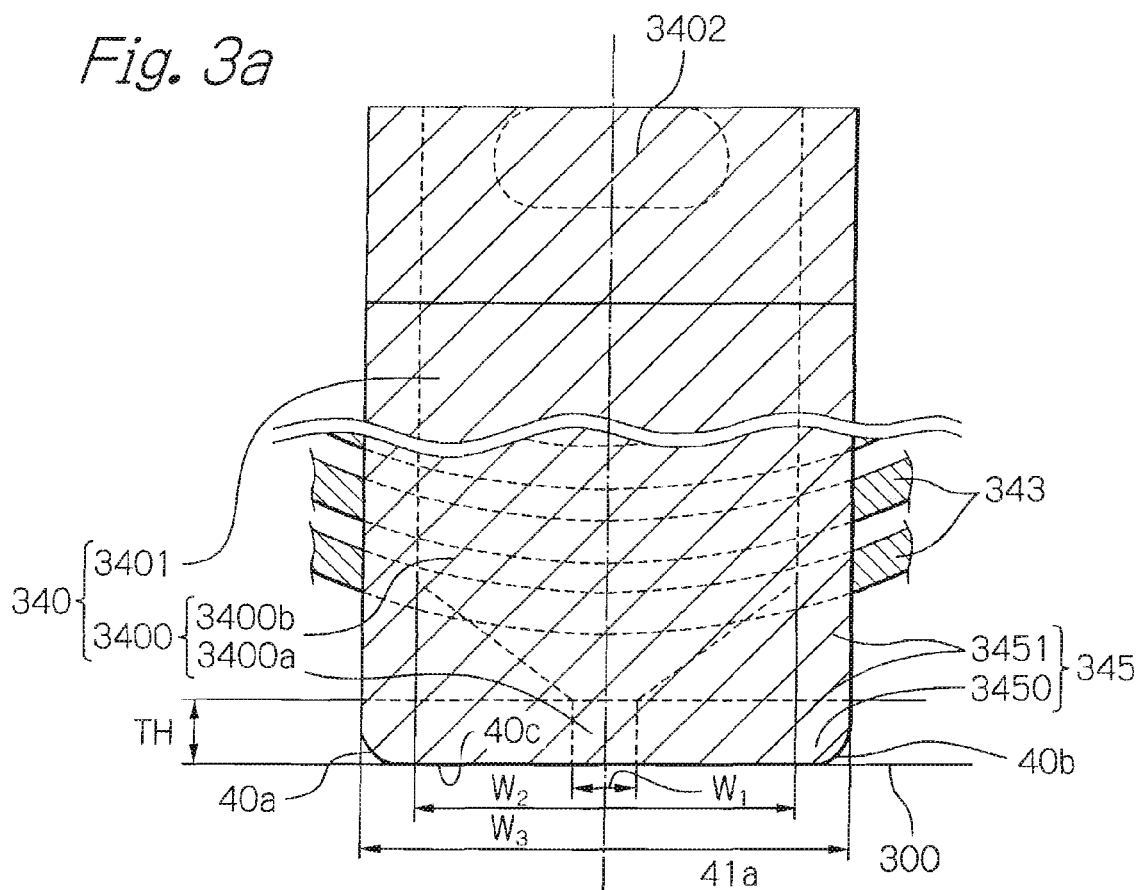
FIG. 3a shows a top view, obtained when viewed down from the position directly above the element formation surface, schematically illustrating positions and shapes of the main magnetic pole layer and the auxiliary magnetic pole layer of the electromagnetic transducer.
Figure 3B:
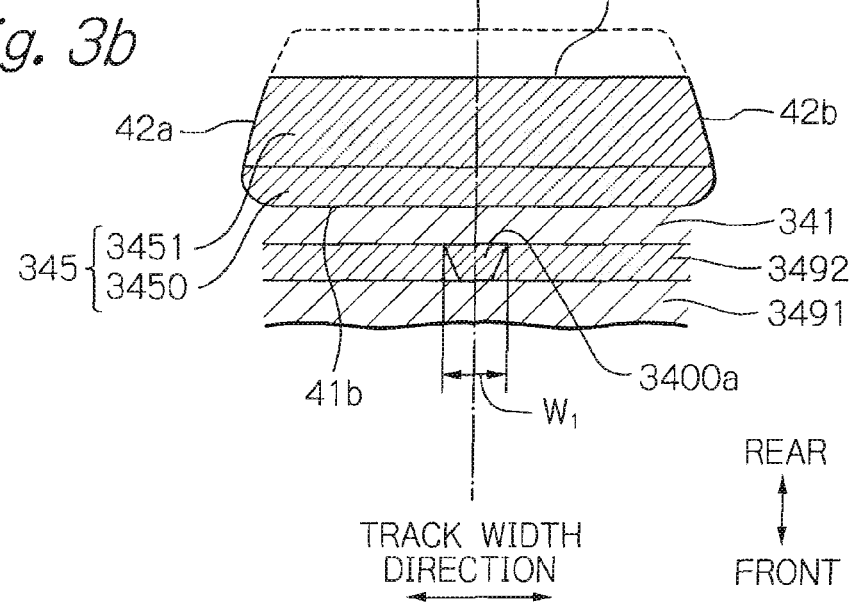
FIG. 3b shows a side view, obtained when viewed from the ABS side, schematically illustrating positions and shapes of the main magnetic pole layer and the auxiliary magnetic pole layer which appear on the head end surface.

FIG. 3a shows a top view, obtained when viewed down from the position directly above the element formation surface 31, schematically illustrating positions and shapes of the main magnetic pole layer 340 and the auxiliary magnetic pole layer of the electromagnetic transducer 34. FIG. 3b shows a side view, obtained when viewed from the ABS 30 side, schematically illustrating positions and shapes of the main magnetic pole layer 340 and the auxiliary magnetic pole layer which appear on the head end surface 300.

As shown in FIG. 3a, the main magnetic pole 3400 is battledore-shaped, and the main pole front end 3400a, which reaches the head end surface 300, corresponds to the part for holding of the battledore. Here, the respective widths $W_1$, $W_2$ and $W_3$ in the track width direction of the main pole front end 3400a, the main pole rear end 3400b (and the main pole body 3401) and the trailing shield portion 3450 are set so as to satisfy the relation of $W_1<W_2<W_3$, as described above. The length in the direction perpendicular to the head end surface of the main pole front end 3400a with a width $W_1$ that determines the track width is defined as a throat height TH that is one of determination factors of the write characteristic of the head. In the present embodiment, the length in the direction perpendicular to the head end surface 300 of the trailing shield portion 3450 is also set to be equal to the throat height TH.

In the trailing shield portion 3450 and the yoke portion 3451, each of edges 40a and 40b corresponding to both side surfaces, obtained when viewed down from the position directly above the element formation surface 31, extends so as to spread obliquely rearward with each other from the end of straight edge 40c in the track width direction corresponding to the front surface. Further, in the present embodiment, each of the edges 40a and 40b is a curve segment in which the more distant from the straight edge 40c a point on the curve segment is, the larger becomes the slope of the curve segment at the point with respect to the straight edge 40c.

Furthermore, as shown in FIG. 3b, on the head end surface 300, an upper straight edge 41a and a lower straight edge 41b of the auxiliary magnetic pole layer 345 are connected to each other through their both ends with curve segments 42a and 42b which are convexly protruded outward. This shape on the head end surface 300 can be recognized as belonging to the case that the upper and lower corner portions in each of both end portions in the track width direction form rounded shapes, and then, the rounded shapes become a continuous one.

The above-described three-dimensional shape near the head end surface 300 of the auxiliary magnetic pole layer 345 enables the concentration of magnetic flux in the layer to be suppressed, to prevent the unwanted writing or erasing. That is, in the auxiliary magnetic pole layer 345, the layer surface near the both ends in the track width direction, at which the magnetic flux is generally likely to be concentrated and unwanted writing or erasing is likely to occur, is set to be a surface without right nor sharp angles. Generally, the degree of the flux concentration on the surface of a magnetic body becomes higher at a corner portion having right or sharp angle. Therefore, it is understood that the above-described surface without right nor sharp angles can suppress the flux concentration.

Here, the "surface without right nor sharp angles" will be explained. If, when going along a path on a surface, there is a discontinuity in the changing slope of the path, the discontinuity point of the path is judged to form an "angle". When any angle on any path becomes obtuse on a surface or there is no angle on any path on a surface, the surface is defined as a "surface without right nor sharp angles".

As shown in FIG. 3b, the main pole front end 3400a appearing on the head end surface 300 has a trapezoidal shape with a longer edge on the trailing side (on the upper side). The length of the longer edge determines the width $W_1$ corresponding to the track width. This trapezoidal shape of the main pole front end 3400a plays a role of preventing unwanted writing or erasing to the adjacent tracks due to the influence of a skew angle of the head which arises from the angular-pivoting movement of the drive arm 14. The trailing shield portion 3450 is opposed to the main pole front end 3400a through the gap layer 341. The distance between them opposed to each other is defined as a write gap (on the trailing side), which is one of determination factors of the write characteristic.

FIG. 4a shows a top view, obtained when viewed down from the position directly above the element formation surface 31, schematically illustrating positions and shapes of the upper and lower shield layers 334 and 330 and the inter-element shield layer 38 of the MR element 33. FIG. 4b shows a side view, obtained when viewed from the ABS 30 side, schematically illustrating positions and shapes of the upper and lower shield layers 334 and 330 and the inter-element shield layer 38 which appear on the head end surface 300.

As shown in FIG. 4a, the upper and lower shield layers 334 and 330 and the inter-element shield layer 38 have a common width $W_4$ in the track width direction. The width $W_4$ is set to be a value, the layers with which can sufficiently shield a magnetic field to affect the MR multilayer 332 as a noise. As a matter of course, the widths of these shield layers may be different from each other under satisfying the just-described shielding condition.

In each of the upper and lower shield layers 334 and 330 and the inter-element shield layer 38, each of edges 43a and 43b corresponding to both side surfaces, obtained when viewed down from the position directly above the element formation surface 31, extends so as to spread obliquely rearward with each other from the end of straight edge 43c in the track width direction corresponding to the front surface. Further, in the present embodiment, each of the edges 43a and 43b is a curve segment in which the more distant from the straight edge 43c a point on the curve segment is, the larger becomes the slope of the curve segment at the point with respect to the straight edge 43c.

Furthermore, as shown in FIG. 4b, on the head end surface 300, upper and lower straight edges 44a and 44b, 46a and 46b, and 48a and 48b of the inter-element shield layer 38, the upper and shield layer 334, and the lower shield layer 330 are connected to each other through their both ends with curve segments 45a and 45b, 47a and 47b, and 49a and 49b which are convexly protruded outward, respectively.

The above-described three-dimensional shape near the head end surface 300 of each of the upper and lower shield layers 334 and 330 and the inter-element shield layer 38 enables the concentration of magnetic flux in the layer to be suppressed, to prevent the unwanted writing or erasing. That is, in each of these layers, the layer surface near the both ends in the track width direction, at which the magnetic flux is generally likely to be concentrated and unwanted writing or erasing is likely to occur, is set to be a surface without right nor sharp angles. It is understood that this surface without right nor sharp angles can suppress the flux concentration.

Figure 5:
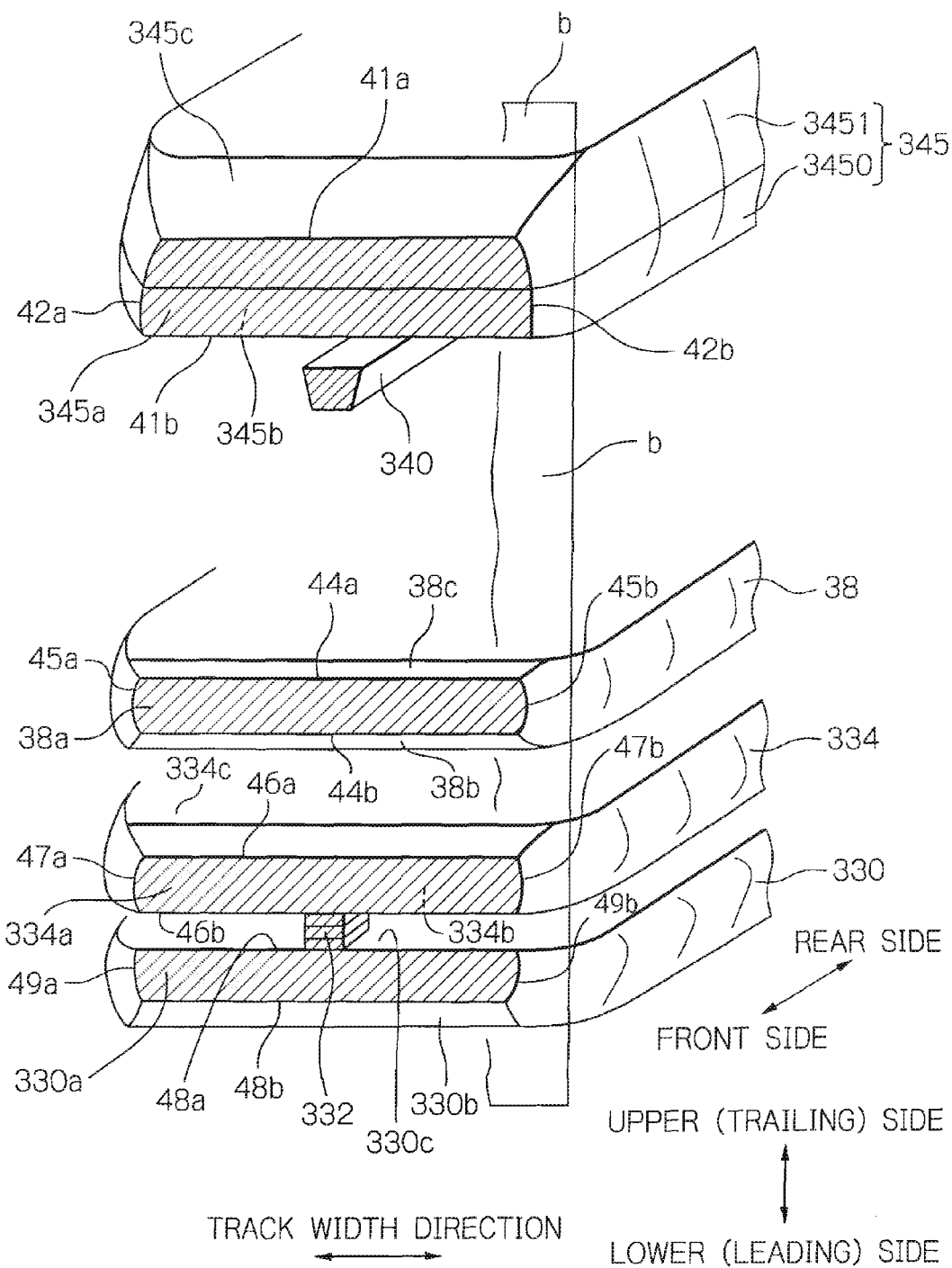
FIG. 5 shows a perspective view, obtained when viewed down from the position on the head end surface side and obliquely above the element formation surface, schematically illustrating three-dimensional shapes near the head end surface of the upper and lower shield layers, the inter-element shield layer, the main magnetic pole layer, and the auxiliary magnetic pole layer, which are shown in FIGS. 3a and 3b and FIGS. 4a and 4b.

FIG. 5 shows a perspective view, obtained when viewed down from the position on the head end surface 300 side and obliquely above the element formation surface 31, schematically illustrating three-dimensional shapes near the head end surface of the upper and lower shield layers 334 and 330, the inter-element shield layer 38, the main magnetic pole layer 340, and the auxiliary magnetic pole layer 345, which are shown in FIGS. 3a and 3b and FIGS. 4a and 4b.

As shown in FIG. 5, in each of the upper and lower shield layers 334 and 330, the inter-element shield layer 38, the main magnetic pole layer 340, and the auxiliary magnetic pole layer 345, the cross-section near the head end surface 300 taken by a plane (for example, plane b in the figure) parallel to the head end surface 300 has a shape in which there are upper and lower straight edges and these upper and lower straight edges are connected to each other through their both ends with curve segments which are convexly protruded outward. These shapes enable the concentration of magnetic flux at the end portions of these layers to be suppressed in positions recessed rearward from the head end surface 300 as well as in positions on the head end surface 300, to prevent the unwanted writing or erasing more surely.

Also in FIG. 5, the front surface 345a and the lower (bottom) surface 345b of the auxiliary magnetic pole layer 345 (the trailing shield layer 4350) form right or substantially right angle (90° or approximately 90°) with a straight edge 41b as an intersection line. Here, "substantially right angle" means an angle of the case in which the corner portion becomes round or the adjacent surfaces form an angle deviated from just right angle inevitably due to the formation process of the layer. By forming this right or substantially right angle, the write gap can be clearly determined, and the trailing shield portion 3450 can bring out the intended effect of shunting the magnetic flux.

Further, in the present embodiment, the front surface 345a and the upper surface 345c of the auxiliary magnetic pole layer 345 form obtuse angle with a straight edge 41a as an intersection line. As a result, the flux concentration can also be suppressed near the straight edge 41a.

The front surface 334a and the lower surface 334b of the upper shield layer 334 form right or substantially right angle with a straight edge 46b as an intersection line. And the front surface 330a and the upper surface 330c of the lower shield layer 330 form right or substantially right angle with a straight edge 48a as an intersection line. Here, the lower surface 334b of the upper shield layer 334 and the upper surface 330c of the lower shield layer 330 are layer surfaces sandwiching the MR multilayer 332 and parallel to the element formation surface 31. Thus, the distance between both layer surfaces is defined as a read gap. By forming this right or substantially right angle, the read gap on the head end surface 300 can be clearly determined, and the MR element can realize the intended resolution of data.

Further, in the present embodiment, the front surface 38a and the upper surface 38c of the inter-element shield layer 38 form obtuse angle with a straight edge 44a as an intersection line. And the front surface 38a and the lower surface 38b of the inter-element shield layer 38 form obtuse angle with a straight edge 44b as an intersection line. As a result, the flux concentration can also be suppressed near these straight edges.

As described above, the three-dimensional shapes provided for suppressing the flux concentration in the end portions of the upper and lower shield layers, the inter-element shield layer and the auxiliary magnetic pole layer, have been explained by using FIGS. 3a and 3b, FIGS. 4a and 4b and FIG. 5. Here, the three-dimensional shape may be adopted, for example, into only one of these layers, into only the upper and lower shield layers, or into only the upper and lower shield layers and the inter-element shield layer. In fact, the layer or the position in the layer in which the flux concentration becomes significant due to external magnetic field or write field depends upon the head design. Therefore, it can be determined, according to the head design and so, which layer the above-described three-dimensional shape should be adopted into. Further, the adoptable three-dimensional shape is not limited to the above described, and various alternatives can be adopted as described below.

FIGS. 6a to 6c show side views, obtained when viewed from the ABS 30 side, illustrating various alternatives with respect to the shape appearing on the head end surface 300 in the upper and lower shield layers, the inter-element shield layer, and the auxiliary magnetic pole layer of the thin-film magnetic head according to the present invention. And FIGS. 6d and 6e show top views, obtained when viewed down from the position directly above the element formation surface 31, schematically illustrating various alternatives with respect to the upper and lower shield layers, the inter-element shield layer, the main magnetic pole layer, and the auxiliary magnetic pole layer of the thin-film magnetic head according to the present invention. Here, the planar shape, obtained when viewed down from the position directly above the element formation surface 31, of each of the layers shown in FIGS. 6a to 6c is the same as that of the above described upper and lower shield layers 334 and 330, the inter-element shield layer 38, or the auxiliary magnetic pole layer 345, or is the same as that shown in FIG. 6d or FIG. 6e. Further, the shape appearing on the head end surface 300 of each of the layers shown in FIGS. 6d and 6e is the same as that of the above described upper and lower shield layers 334 and 330, the inter-element shield layer 38, or the auxiliary magnetic pole layer 345, or is the same as that shown in FIG. 6a, FIG. 6b or FIG. 6c.

According to FIG. 6a, in at least one layer 50 out of the upper and lower shield layers, the inter-element shield layer, and the auxiliary magnetic pole layer, the front surface reaching the head end surface 300 has a shape in which upper corner portions 50a and 50b and lower corner portions 50c and 50d in both end portions in the track width direction are rounded. The segment between the rounded upper and lower corner portions is straight, that is, the shape is a quadrilateral with four rounded corners. In the layer 50 having this shape, the flux concentration in the end portions of the layer can be suppressed, and thus, unwanted writing or erasing can be prevented. That is, in the layer 50, the layer surface near the both ends in the track width direction, at which the magnetic flux is generally likely to be concentrated due to the application of external magnetic field or write field and unwanted writing or erasing is likely to occur, is set to be a surface without right nor sharp angles. It is understood that the above-described surface without right nor sharp angles can suppress the flux concentration.

According to FIG. 6b, in at least one layer 51 out of the upper and lower shield layers, the inter-element shield layer, and the auxiliary magnetic pole layer, the front surface reaching the head end surface 300 has a shape in which upper corner portions 51a and 51b and lower corner portions 51c and 51d in both end portions in the track width direction have obtuse angles. As shown in the figure, each of the corner portions has two obtuse angles. The segment between the upper and lower corner portions with obtuse angles is straight. In the layer 51 having this shape, the flux concentration in the end portions of the layer can be suppressed, and thus, unwanted writing or erasing can be prevented. That is, in the layer 51, the layer surface near the both ends in the track width direction, at which the magnetic flux is generally likely to be concentrated due to the application of external magnetic field or write field and unwanted writing or erasing is likely to occur, is set to be a surface without right nor sharp angles. It is understood that the above-described surface without right nor sharp angles can suppress the flux concentration.

According to FIG. 6c, in at least one layer 52 out of the upper and lower shield layers, the inter-element shield layer, and the auxiliary magnetic pole layer, upper and lower straight edges 52a and 52b appearing on the head end surface 300 are connected to each other through their both ends with curve segments 52c and 52d which are convexly protruded outward. Here, in the figure, each of the most protruded points 52c' and 52d' on the curve segments 52c and 52d may be set to be at the center position in the thickness direction (the upper and lower direction) of the layer 52, or may be set to be at the upper or lower position compared with the center position. For example, in the case that the most protruded points are set to be at the upper position compared with the center position as shown in the figure, the respective segment portions upper than the most protruded points 52c' and 52d' on each of the curve segments 52c and 52d have a curvature radius smaller than that of the lower segment portions. The positions of the most protruded points 52c' and 52d' can be adjusted by using, for example, a frame plating method, as described in detail later. In either case, the curve segments 52c and 52d do not have corners in which the flux concentration is likely to occur. As a result, the flux concentration in the end portions of the layer can be suppressed, and thus, unwanted writing or erasing can be prevented.

According to FIG. 6d, in at least one layer 53 out of the upper and lower shield layers, the inter-element shield layer, and the auxiliary magnetic pole layer, each of edges 53a and 53b corresponding to both side surfaces, obtained when viewed down from the position directly above the element formation surface 31, extends so as to spread obliquely rearward with each other from the end of straight edge 53c in the track width direction corresponding to the front surface. Further, each of the edges 53a and 53b in the present embodiment is a curve segment in which, the more distant from the straight edge 53c a point on the curve segment is, the larger becomes the slope of the curve segment at the point with respect to the straight edge 53c. Here, when angle $\theta_1$ is defined as an angle formed between the straight edge 53c and a tangent line at each of the corner points 53a' and 53b' of the edges 53a and 53b, various alternatives with various angles $\theta_1$ in the range of $0<\theta_1<90°$ (degrees) can be provided. The size and the front surface of the layer 53 are determined by the polishing work during MR height process, and then, the angle $\theta_1$ can be adjusted by choosing the shape and curvature of the curved surfaces to be polished of the shape 530 prior to the polishing of the layer 53, and by choosing the position of the resulting polished surface. Actually, the angle $\theta_1$ is preferably in the range of $0<\theta_1<45°$, and for example, 15° in order to effectively suppress the flux concentration.

According to FIG. 6e, in at least one layer 54 out of the upper and lower shield layers, the inter-element shield layer, and the auxiliary magnetic pole layer, each of straight edges 54a and 54b corresponding to both side surfaces, obtained when viewed down from the position directly above the element formation surface 31, extends so as to spread obliquely rearward with each other from the end of straight edge 54c in the track width direction corresponding to the front surface. In the layer 54 having this shape, the flux concentration in the end portions of the layer can be suppressed, and thus, unwanted writing or erasing can be prevented. That is, in the layer 54, the layer surface near the both ends in the track width direction, at which the magnetic flux is generally likely to be concentrated due to the application of external magnetic field or write field and unwanted writing or erasing is likely to occur, is set to be a surface without right nor sharp angles. It is understood that the above-described surface without right nor sharp angles can suppress the flux concentration.

Here, when angle $\theta_2$ is defined as an angle formed between the straight edge 54c and each of the straight edges 54a and 54b, various alternatives with various angles $\theta_2$ in the range of $0<\theta_2<90°$ (degrees) can be provided. The size and the front surface of the layer 54 are determined by the polishing work during MR height process, and then, the angle $\theta_2$ can be adjusted by choosing the slope of the oblique straight edges of the shape 540 prior to the polishing of the layer 54. Actually, the angle $\theta_2$ is preferably in the range of $0<\theta_1<45°$, and for example, 15° in order to effectively suppress the flux concentration.

As described above, various alternatives with respect to the three-dimensional shapes near the head end surface of the upper and lower shield layers, the inter-element shield layer and the auxiliary magnetic pole layer of the thin-film magnetic head according to the present invention, have been explained. However, the adoption of the three-dimensional shapes of these alternatives and of the embodiments shown in FIGS. 3a and 3b and FIGS. 4a and 4b is not limited to the adoption into the upper and lower shield layers, the inter-element shield layer and the auxiliary magnetic pole layer of the thin-film magnetic head. That is, in the case that at least one of multiple magnetic layers in which the front surface reaches the head end surface on the ABS side is likely to have flux concentration due to the application of external magnetic field or write field, the above-described three-dimensional shapes may be adopted to the at least one magnetic layer, regardless of its width in the track width direction.

In the above-described case, the layer surface near the both ends in the track width direction of at least one of the multiple magnetic layers, at which the magnetic flux is generally likely to be concentrated due to the application of external magnetic field or write field, is set to be a surface without right nor sharp angles, which suppresses the flux concentration. As a result, unwanted writing or erasing can be prevented.

Next, the forming method of the three-dimensional shape near the head end surface according to the present invention will be explained.

Respective FIG. 7a1 to 7a3 and FIG. 7b1 to 7b3 show cross-sectional views for explaining the forming method of the layer having a cross-section shape with rounded upper and lower corner portions. The cross-sections in these figures are parallel to the head end surface 300.

FIG. 7a1 to 7a3 show the forming method of the cross-section shape of, for example, the layer shown in FIG. 6a. First, as shown in FIG. 7a1, a plating electrode film 61 made of a conductive material such as Cu is deposited on a base layer 60 by using, for example, a sputtering method. Here, in the case of forming the lower shield layer 330, the base layer 60 is equivalent to the insulating layer 320 (shown in FIG. 2).

Next, a resist frame layer 62 made of a photoresist having a predetermined pattern is formed on the plating electrode film 61. In the resist frame layer 62, skirt shapes 62a and 62b are formed in the bottom portions of the frame pattern, for example, by using a photoresist with lower degree of transparency to exposure light, or by decreasing the amount of exposure.

Then, as shown in FIG. 7a2, a magnetic film 63 is formed by using a frame plating method with the plating electrode film 61 as an electrode. Here, in the case of using, for example, $Ni_{80}Fe_{20}$ (Permalloy) as a material for the magnetic film 63, used is a Watts bath of Ni (nickel) in which Fe (iron) ion is added. Further, the amount of added interfacial active agent of the plating solution is increased to a predetermined value. The increased amount of added interfacial active agent causes the upper corner portions 63a and 63b in both end portions of the deposited magnetic film 63. Whereas, the lower corner portions in both end portions of the deposited magnetic film 63 also becomes rounded along the skirt shapes 62a and 62b of the resist frame layer 62.

At the last, as shown in FIG. 7a3, the resist frame layer 62 is removed by using a remover or so, and then, by eliminating the exposed portions of the plating electrode film 61, formed is a layer 64 having a cross-section shape with rounded upper and lower corner portions.

FIG. 7b1 to 7b3 show the forming method of the cross-section shape of, for example, the upper and lower shield layers 334 and 330 and the inter-element shield layer 38 shown in FIG. 4b. First, as shown in FIG. 7b1, a plating electrode film 66 made of a conductive material such as Cu is deposited on a base layer 65 by using, for example, a sputtering method. Here, in the case of forming the lower shield layer 330, the base layer 65 is equivalent to the insulating layer 320 (shown in FIG. 2).

Next, a resist frame layer 67 made of a photoresist having a predetermined pattern is formed on the plating electrode film 66. In the resist frame layer 67, the inner wall edges 67a and 67b of the cross-section shape become curve segments with convex shape protruded toward inside of the resist, by, for example, applying thicker photoresist (for example, with thickness of 2 μm or more) and exposing the photoresist with the use of the photolithography machine with larger optical numerical aperture NA so as to reduce the focal depth of exposure light.

Then, as shown in FIG. 7b2, a magnetic film 68 is formed by using a frame plating method with the plating electrode film as an electrode. Here, in the case of using, for example, $Ni_{80}Fe_{20}$ (Permalloy) as a material for the magnetic film 68, used is a Watts bath of Ni (nickel) in which Fe (iron) ion is added. The side edges of the cross-section shape of the deposited magnetic film 68 become curve segments protruded convexly toward outside, along the wall edges 67a and 67b of the resist frame layer 67.

At the last, as shown in FIG. 7b3, the resist frame layer 67 is removed by using a remover or so, and then, by eliminating the exposed portions of the plating electrode film with the use of, for example, a milling method, formed is a layer 69 having a cross-section shape in which both side edges are curve segments protruded convexly toward outside.

As explained above, formed are the layers 64 and 69 having the cross-section shape with rounded upper and lower corner portions (which includes the cross-section shape in which both side edges are curve segments protruded convexly toward outside), by using the methods shown in respective FIG. 7a1 to 7a3 and FIG. 7b1 to 7b3. Finally, the above-described three-dimensional shapes near the head end surface according to the present invention can be formed; by using the resist frame layer in which the cross-section taken by any plane perpendicular to the element formation surface 31 (layer surface) and the wall surface has the same shape as that shown in FIG. 7a1 or FIG. 7b1; by designing the planar shape, obtained when viewing the layers 64 and 69 down from the position directly above the element formation surface 31, to be the shape 530 shown in FIG. 6d or the shape 540 shown in FIG. 6e, for example; and further by polishing the layers 64 and 69 during MR height process.

Figure 8A:
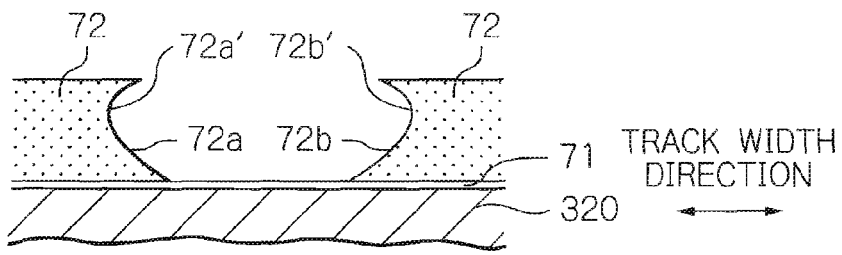
FIGS. 8a to 8e show cross-sectional views and a perspective view for explaining the forming method of the lower shield layer having surfaces forming right or substantially right angle on the side of sandwiching the MR multilayer as shown in FIG. 5.
Figure 8B:
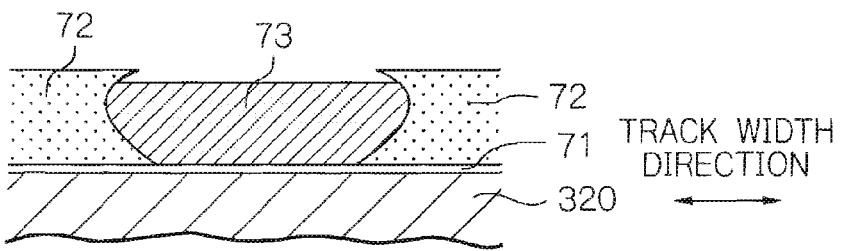
Figure 8C:
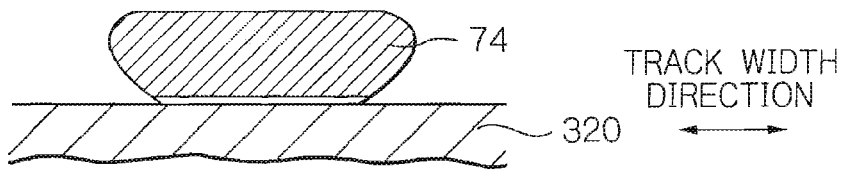
Figure 8D:
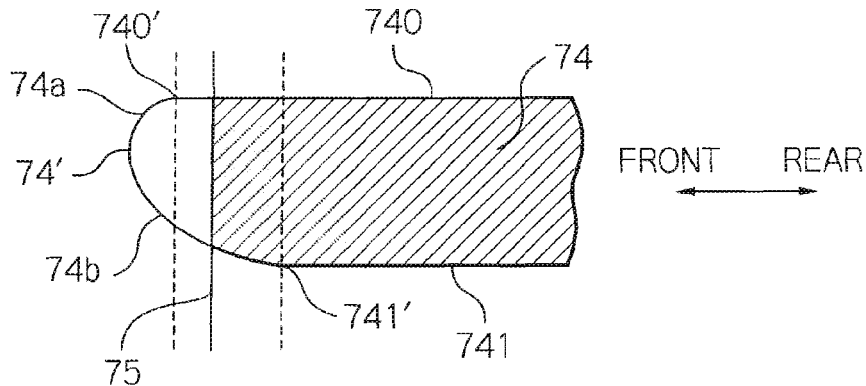
Figure 8E:
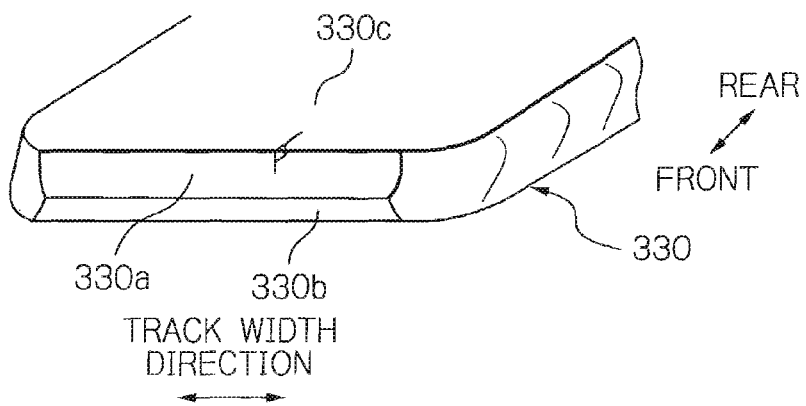

FIGS. 8a to 8e show cross-sectional views and a perspective view for explaining the forming method of the lower shield layer 330 having surfaces forming right or substantially right angle on the side of sandwiching the MR multilayer 332 as shown in FIG. 5. The cross-sections in FIGS. 8a to 8c are parallel to the ABS 30 (the head end surface 300), and the cross-section in FIG. 8d is perpendicular to the ABS 30 (the head end surface 300) and the element formation surface 31 (layer surface). Further, FIG. 8e shows a perspective view obtained when viewed down from the position on the head end surface 300 side and obliquely above the element formation surface 31.

First, as shown in FIG. 8a, a plating electrode film 71 made of a conductive material such as Cu is deposited on an insulating layer 320 by using, for example, a sputtering method. Next, a resist frame layer 72 made of a photoresist having a predetermined pattern is formed on the plating electrode film 71. In the resist frame layer 72, the inner wall edges 72a and 72b of the cross-section shape become curve segments with convex shape protruded toward inside of the resist, by, for example, applying thicker photoresist (for example, with thickness of 2 μm or more) and exposing the photoresist with the use of the photolithography machine with larger optical numerical aperture NA so as to reduce the focal depth of exposure light. Further, each of the most protruded points 72a' and 72b' on the wall edges 72a and 72b is designed to be at the upper position compared with the center position in the thickness direction (the upper and lower direction) of the resist, by setting the focal position of exposure light to be the upper position in the thickness direction of the resist. On the contrary, in the case that each of the most protruded points 72a' and 72b' is designed to be the lower position compared with the center position, the focal position of exposure light would be set to be the lower position. Any cross-section of the resist frame layer 72, taken by any plane perpendicular to the element formation surface 31 (layer surface) and the wall surface, may be designed so as to be the same as that shown in FIG. 8a.

Then, as shown in FIG. 8b, a magnetic film 73 is formed by using a frame plating method with the plating electrode film 71 as an electrode. Here, in the case of using, for example, $Ni_{80}Fe_{20}$ (Permalloy) as a material for the magnetic film 73, used is a Watts bath of Ni (nickel) in which Fe (iron) ion is added. The side edges of the cross-section shape of the deposited magnetic film 73 become curve segments protruded convexly toward outside, along the wall edges 72a and 72b of the resist frame layer 72.

Next, as shown in FIG. 8c, the resist frame layer 72 is removed by using a remover or so, and then, by eliminating the exposed portions of the plating electrode film 71 with the use of, for example, a milling method, formed is a layer 74 having a cross-section shape in which both side edges are curve segments protruded convexly toward outside. Here, the planar shape obtained when viewing the layer 74 down from the position directly above the element formation surface 31, is designed to be the shape 530 shown in FIG. 6d or the shape 540 shown in FIG. 6e, for example.

After that, as shown in FIG. 8d, a polishing as the MR height process is performed to the layer 74. In the cross-section of the layer 74 shown in FIG. 8d, the upper edge 740 and the lower edge 741 are connected with each other by curve segments protruded convexly toward outside. And the curve segment portion 74a upper than the most protruded point 74' has a curvature radius smaller than that of the lower curve segment portion 74b. During polishing these curve segment portions of the layer 75, the resulting polished surface 75 is adjusted so as to be positioned at the rear of the contact point 740' between the upper edge 740 and the curve segment portion 74a, and at the front of the contact point 741' between the lower edge 741 and the curve segment portion 74b.

As the result of the polishing, as shown in FIG. 8e, formed is the lower shield layer 330 in which the front surface 330a and the upper surface 330c form right or substantially right angle, and the front surface 330a and the lower surface 330b form obtuse angle.

Meanwhile, the upper shield layer 334 can also be formed in the same way, by setting each of the most protruded points 72a' and 72b' in FIG. 8a to be the lower position compared with the center position in the thickness direction (the upper and lower direction) of the resist.

Hereinafter, the effect of the three-dimensional shapes near the head end surface according to the present invention that the tolerance to external magnetic field is improved and the adjacent tracks do not suffer unwanted erasing, will be presented by using practical examples.

[Explanation of Samples Used for Practical and Comparative Examples]

As head samples used for practical examples and comparative examples, the thin-film magnetic heads according to the embodiments shown in FIGS. 1 to 5 were provided. However, in the provided heads, only the lower shield layer had the three-dimensional shapes near the head end surface according to the present invention; that is, prepared were the thin-film magnetic heads having the lower shield layers with various shapes. The lower shield layers had a layer thickness of 1.5 μm. Further, the width in the track width direction of the lower shield layers on the head end surface on the ABS side was 40 μm. Whereas, the width in the track width direction of the upper shield layers, the inter-element shield layers and the auxiliary magnetic pole layers on the head end surface on the ABS side had values different, by 10 μm or more, from 40 μm of the lower shield layers. As a result, a test for examining the tolerance to external magnetic field of only the lower shield layers could be performed.

FIG. 9 shows perspective views illustrating the shapes of the lower shield layers in head samples Aα to Fγ used for practical and comparative examples.

In the head samples Aα to Fγ shown in FIG. 9, samples with α (alpha) as their reference characters had shapes in which each of edges corresponding to both side surfaces of the lower shield layer, obtained when viewed down from the position directly above the element formation surface, extended so as to spread obliquely rearward with each other from the end of straight edge in the track width direction corresponding to the front surface, as shown, for example, in FIG. 4a or FIG. 6d. Further, each of the edges corresponding to both side surfaces was a curve segment in which, the more distant from the straight edge a point on the curve segment is, the larger becomes the slope of the curve segment at the point with respect to the straight edge. The angle $\theta_1$ formed between the straight edge in the track width direction and a tangent line at each of the edges corresponding to both side surfaces was 15° (degrees).

Further, samples with β (beta) as their reference characters had shapes in which each of straight edges corresponding to both side surfaces of the lower shield layer, obtained when viewed down from the position directly above the element formation surface, extended so as to spread obliquely rearward with each other from the end of straight edge in the track width direction corresponding to the front surface, as shown, for example, in FIG. 6e. The angle $\theta_2$ formed between the straight edge in the track width direction and each of the straight edges corresponding to both side surfaces was 15° (degrees). Furthermore, samples with γ (gamma) as their reference characters had the lower shield layers with rectangular shapes obtained when viewed down from the position directly above the element formation surface.

Further, samples with A as their reference characters had shapes in which, on the head end surface, the upper and lower straight edges of the lower shield layer are connected with each other through their both ends by curve segments protruded convexly toward outside, as shown, for example, in FIG. 4b. Here, the curvature radius R in the lower portion of the curve segment was approximately 1 μm, and the curvature radius R in the upper portion of the curve segment was approximately 0.5 μm. Samples with B as their reference characters had shapes in which the front surface reaching the head end surface of the lower shield layer had rounded upper and lower corner portions in both end portions in the track width direction, as shown, for example, in FIG. 6a. Here, the curvature radius R in the upper and lower corner portions was approximately 0.5 μm, and the length of the straight edge between the upper and lower corner portions was also approximately 0.5 μm.

Further, samples with C as their reference characters had shapes in which the lower shield layer has a rectangular shape and only the lower corner portions in both end portions in the track width direction were rounded. Here, the curvature radius R in the lower corner portion was approximately 1 μm. This shape of the lower shield layer was formed by using the resist frame layer with skirt shapes as shown in FIG. 7a1. Samples with D as their reference characters had shapes in which the lower shield layer has a rectangular shape and only the upper corner portions in both end portions in the track width direction were rounded. Here, the curvature radius R in the upper corner portion was approximately 0.5 μm. This shape of the lower shield layer was formed by increasing the amount of interfacial active agent added in the plating solution, as shown in FIG. 7a2.

Further, samples with E as their reference characters had the lower shield layer with a rectangular shape on the head end surface. This shape of the lower shield layer was formed by performing a frame plating with a resist frame layer having perpendicular sidewalls. Furthermore, samples with F as their reference characters had a lower shield layer showing a trapezoidal shape with an upper longer edge on the head end surface. This shape of the lower shield layer was formed by performing a frame plating with a resist frame layer having inverse tapered sidewalls.

Notice that, for example, head sample Aα has both of shapes indicated by α and indicated by A. Therefore, in FIG. 9, head samples Aα, Bα, Aβ and Bβ correspond to practical examples according to the present invention, and the other samples correspond to the comparative examples.

[Explanation of the Test for Evaluating the Tolerance to External Magnetic Field]

Next, it will be explained how to conduct the test for evaluating the tolerance to external magnetic field in head samples Aα to Fγ.

First, a center-track is determined on a magnetic disk with coercive force of 4000 Oe (approximately 318 kA/m). Then, an erasing operation was performed, with use of target head sample, on the range of ±100 μm in the disk radius direction with the center-track as a center. The signals used during the erasing operation had frequencies in the range of 150 to 300 MHz. Next, a write operation was performed, with use of the target head sample, on the range of ±80 μm in the disk radius direction with the center-track as a center and with a track pitch of 1 μm, to form a plurality of tracks. The signals used during the write operation had low frequencies in the range of 10 to 15 MHz.

Then, the written low-frequency pattern was read, with use of the target head sample, on all the formed tracks, by which an output P1n from the n-th track in the low frequency was determined for every n value.

Next, a write operation was performed with use of the target head sample on the center-track for 60 seconds, under the condition that external magnetic field of 300 Oe (approximately 23.9 kA/m) in the direction perpendicular to the ABS was applied to the target head sample. The signals used during the write operation had high frequencies in the range of 150 to 300 MHz.

After that, the written low-frequency pattern was read once again, with use of the target head sample, on all the formed tracks, by which an output P2n from the n-th track in the low frequency was determined for every n value.

Then, in every track (every n value), W-ATE=(P2n/P1n)× 100 (%) was determined. Here, when the value of W-ATE is 100% (P2n=P1n), there is no unwanted erasing to the adjacent tracks, and the tolerance to external magnetic field is sufficiently assured. Whereas, the smaller the value of W-ATE is from 100%, the deteriorated becomes the tolerance to external magnetic field due to the more presence of unwanted erasing to the adjacent tracks. As a general guide for the degree of the tolerance to external magnetic field on the actual head-manufacturing floor, a W-ATE value of 95% or more is usually considered as that of a head having sufficient tolerance to external magnetic field.

[The Results of the Test for Evaluating the Tolerance to External Magnetic Field]

Figure 10:
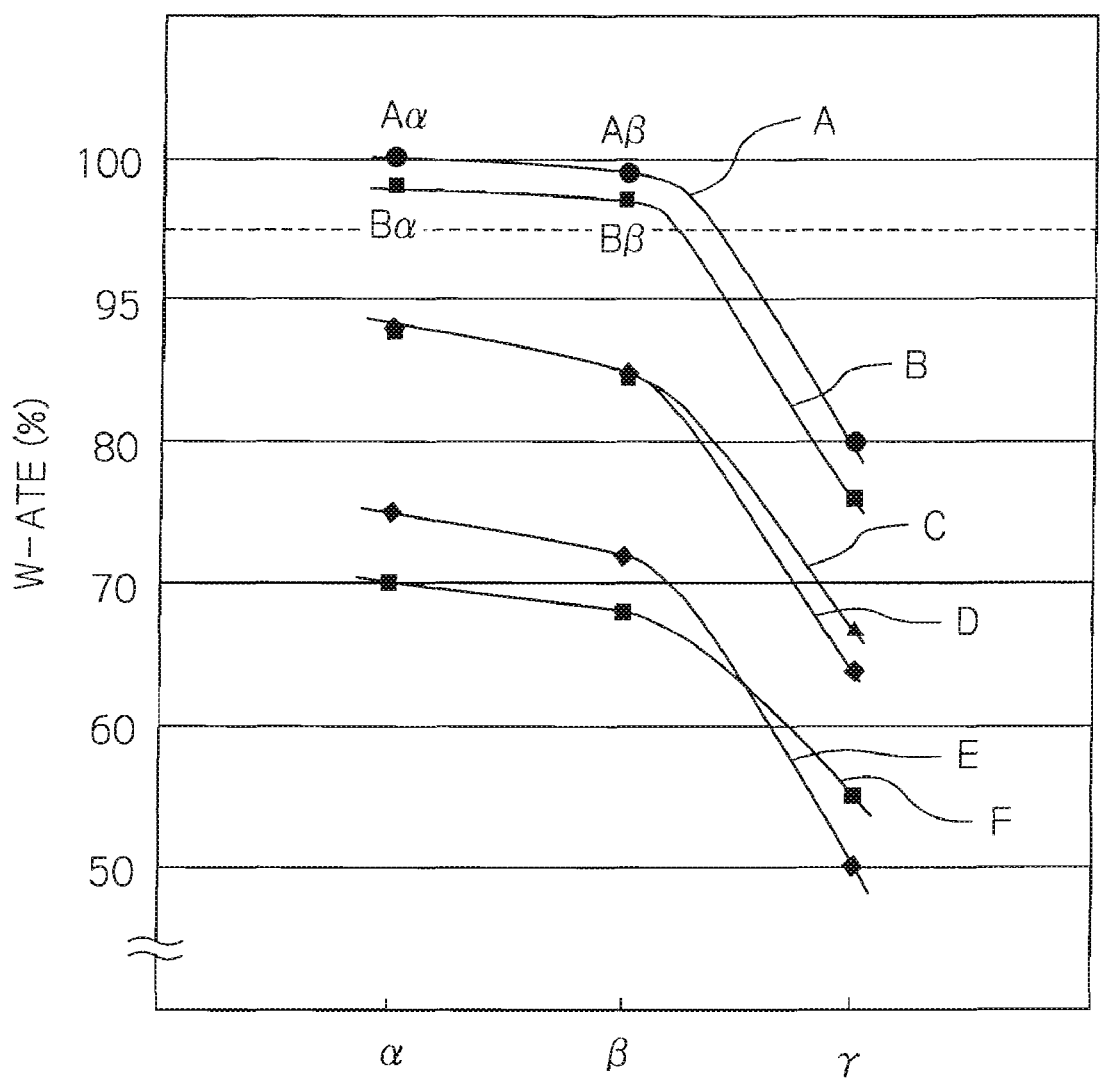
FIG. 10 shows a graph illustrating the results of the test for evaluating the tolerance to external magnetic field in head samples Aα to Fγ.
Figure 11:
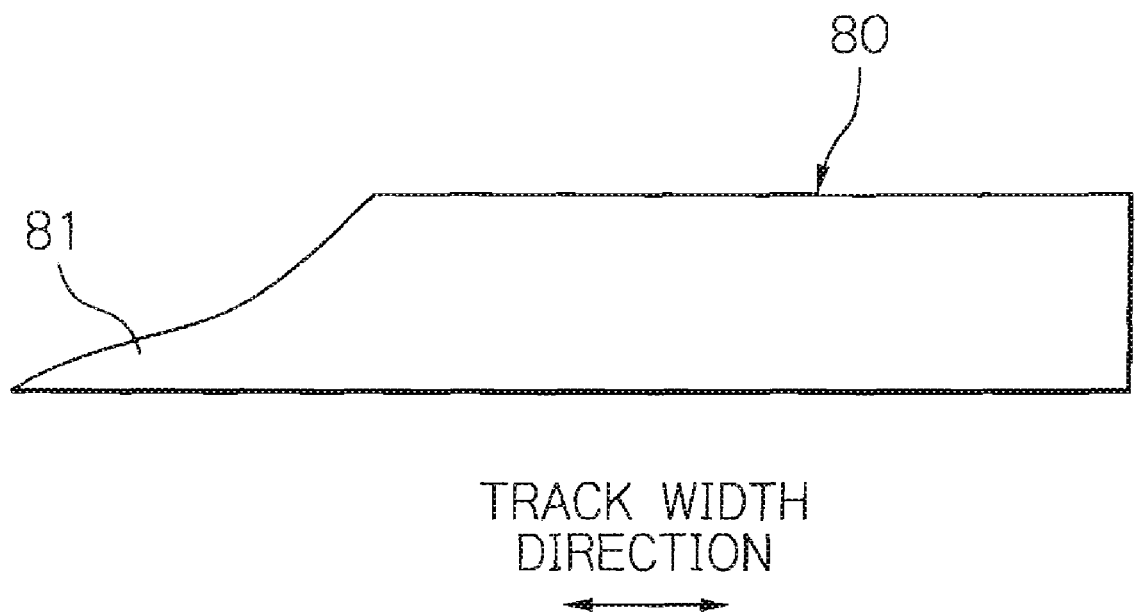
FIG. 11 shows a schematic view illustrating an example of the shape on the head end surface on the ABS side of the conventional lower shield layer, which is deposited by using a sputtering method and patterned by using an ion milling method.

FIG. 10 shows a graph illustrating the results of the test for evaluating the tolerance to external magnetic field in head samples Aα to Fγ.

The vertical axis of FIG. 10 indicates the value of W-ATE, which is an average value among the value on a track positioned apart from the center-track by 20 μm on one side and the values on two tracks that are adjacent to the track and positioned apart from the center-track by 20±1 μm.

Table 1 summarizes the results shown in FIG. 10.

TABLE 1

| W-ATE (%) | α | β | γ |
|---|---|---|---|
| A | 100 | 99 | 80 |
| B | 98 | 97 | 76 |
| C | 88 | 85 | 67 |
| D | 88 | 85 | 64 |
| E | 75 | 72 | 50 |
| F | 70 | 68 | 55 |

As shown in FIG. 10 and Table 1, each of head samples Aα, Bα, Aβ and Bβ has a W-ATE value more than 95%, which shows that the sufficient tolerance to external magnetic field is realized in these samples. Especially, head sample Aα has a W-ATE value of 100%, which shows that negative influence of the external field is almost entirely suppressed. On the contrary, the other head samples have W-ATE values less than 90%, which shows that these samples have the deteriorated tolerance to external magnetic field compared to head samples Aα, Bα, Aβ and Bβ. As understood from the graph, among shapes α, β and γ, shapes α have the most excellent tolerance, shapes β are second-best, and the last are shapes γ. Further, among shapes A to F, shapes A have the most excellent tolerance, and the ranking of the tolerance, from second-best, is approximately B, C, D, E and F.

From the above test results, it is understood that the three-dimensional shapes described below can cause the tolerance to external magnetic field to be sufficiently improved. These three-dimensional shapes are those of the shield layer or the magnetic pole layer, as in head samples Aα, Bα, Aβ and Bβ, in which each of edges corresponding to both side surfaces extends so as to spread obliquely rearward with each other from the end of straight edge in the track width direction corresponding to the front surface, and the front surface reaching the head end surface on the ABS side has the shape with rounded upper and lower corner portions in both end portions in the track width direction.

Further, in this case, it is more preferable, as in head sample Aα, that: each of the edges corresponding to both side surfaces is a curve segment in which, the more distant from the straight edge a point on the curve segment is, the larger becomes the slope of the curve segment at the point with respect to the straight edge; and, on the head end surface on the ABS side, respective upper and lower straight edges are connected to each other through their both ends with curve segments convexly protruded outward. This preferable case can cause very excellent tolerance to external magnetic field to be realized.

Further, in the lower shield layer of head samples Aα, Bα, Aβ and Bβ, the layer surface near the both ends in the track width direction, at which the magnetic flux is generally likely to be concentrated due to the application of external magnetic field or write field and unwanted writing or erasing is likely to occur, is set to be a surface without right nor sharp angles. Therefore, the above-described test results also support that the three-dimensional shape in the layer end portions having a surface without right nor sharp angles makes a significant contribution to the improvement of the tolerance to external magnetic field. In fact, as indicated in the above-described test results, it is understood that quite insufficient is to control only two-dimensional shape such as the shape obtained when viewed down from the position directly above the element formation surface, or the shape of the cross-section or the end surface of the layer. That is, it is not until the shape of the layer end portions is three-dimensionally controlled according to the present invention that the tolerance to external magnetic field can be improved very excellently.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head, comprising:
a substrate having an air bearing surface;
a magnetoresistive element for reading data, formed on/above an element formation surface of said substrate, and comprising two shield layers provided so as to sandwich a magnetoresistive multilayer therebetween; and
an electromagnetic transducer for writing data, formed on/above the element formation surface of said substrate, and comprising two magnetic pole layers as magnetic paths for guiding a magnetic flux excited by a write current flowing through a write coil layer,
each of front surfaces of said two shield layers and said two magnetic pole layers, reaching a head end surface on an air bearing surface side, and
at least one of said two shield layers and magnetic pole layer with a larger width in a track width direction near the head end surface out of said two magnetic pole layers having a shape in which: each of edges corresponding to both side surfaces, obtained when viewed down from a position directly above the element formation surface, extends so as to spread obliquely rearward with each other from an end of a straight edge in the track width direction corresponding to the front surface; and the front surface reaching the head end surface has a shape in which upper and lower corner portions in each of both end portions in the track width direction form obtuse angles or rounded shapes.

2. The thin-film magnetic head as claimed in claim 1, wherein the front surface has a shape in which there are an upper straight edge and a lower straight edge, and the upper and lower straight edges are connected to each other through both of their respective ends with curve segments which are convexly protruded outward.

3. The thin-film magnetic head as claimed in claim 1, wherein a cross-section near the head end surface taken by a plane parallel to the head end surface has a shape in which upper and lower corner portions in each of both end portions in the track width direction form obtuse angles or rounded shapes, in at least one of said two shield layers and said magnetic pole layer with larger width in the track width direction.

4. The thin-film magnetic head as claimed in claim 3, wherein a cross-section near the head end surface taken by a plane parallel to the head end surface has a shape in which there are an upper straight edge and a lower straight edge, and the upper and lower straight edges are connected to each other through both of their respective ends with curve segments which are convexly protruded outward, in at least one of said two shield layers and said magnetic pole layer with larger width in the track width direction.

5. The thin-film magnetic head as claimed in claim 1, wherein the front surface has a quadrilateral shape with four rounded corners.

6. The thin-film magnetic head as claimed in claim 1, wherein each of said edges corresponding to both side surfaces is a curve segment in which, as a point on the curve segment becomes more distant from the straight edge, the slope of the curve segment at the point becomes larger with respect to the straight edge.

7. The thin-film magnetic head as claimed in claim 1, wherein each of said edges corresponding to both side surfaces is a straight line segment.

8. The thin-film magnetic head as claimed in claim 1, wherein at least one of said two shield layers has a shape in which: each of edges corresponding to both side surfaces, obtained when viewed down from the position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and wherein, in each of said two shield layers, the front surface reaching the head end surface and a surface parallel to the element formation surface and on a side sandwiching said MR multilayer form a right or a substantially right angle.

9. The thin-film magnetic head as claimed in claim 1, wherein said magnetic pole layer with larger width in the track width direction has a shape in which: each of edges corresponding to both side surfaces, obtained when viewed down from a the position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and wherein, in said magnetic pole layer with larger width in the track width direction, the front surface reaching the head end surface and a surface parallel to the element formation surface and on a side opposed to the other magnetic pole layer form a right or a substantially right angle.

10. The thin-film magnetic head as claimed in claim 1, wherein, in at least one of said two shield layers and said magnetic pole layer with larger width in the track width direction, a layer surface near both ends in the track width direction, at which a magnetic flux is generally likely to be concentrated due to application of external magnetic field or write field and unwanted writing or erasing is likely to occur, is a surface without right or sharp angles.

11. A head gimbal assembly comprising a thin-film magnetic head and a support means for supporting said thin-film magnetic head, said thin-film magnetic head comprising:

a substrate having an air bearing surface;

a magnetoresistive element for reading data, formed on/above an element formation surface of said substrate, and comprising two shield layers provided so as to sandwich a magnetoresistive multilayer therebetween; and an electromagnetic transducer for writing data, formed on/above the element formation surface of said substrate, and comprising two magnetic pole layers as magnetic paths for guiding a magnetic flux excited by a write current flowing through a write coil layer, each of front surfaces of said two shield layers and said two magnetic pole layers, reaching a head end surface on an air bearing surface side, at least one of said two shield layers and a magnetic pole layer with a larger width in a track width direction near the head end surface out of said two magnetic pole layers having a shape in which: each of edges corresponding to both side surfaces, obtained when viewed down from a position directly above the element formation surface, extends so as to spread obliquely rearward with each other from an end of a straight edge in the track width direction corresponding to the front surface; and the front surface reaching the head end surface has a shape in which upper and lower corner portions in each of both end portions in the track width direction form obtuse angles or rounded shapes, and said head gimbal assembly further comprising signal lines for said magnetoresistive element and said electromagnetic transducer.

12. The head gimbal assembly as claimed in claim 11, wherein the front surface has a shape in which there are an upper straight edge and a lower straight edge, and the upper and lower straight edges are connected to each other through both of their respective ends with curve segments which are convexly protruded outward.

13. The head gimbal assembly as claimed in claim 11, wherein a cross-section near the head end surface taken by a plane parallel to the head end surface has a shape in which upper and lower corner portions in each of both end portions in the track width direction form obtuse angles or rounded shapes, in at least one of said two shield layers and said magnetic pole layer with larger width in the track width direction.

14. The head gimbal assembly as claimed in claim 13, wherein a cross-section near the head end surface taken by a plane parallel to the head end surface has a shape in which there are an upper straight edge and a lower straight edge, and the upper and lower straight edges are connected to each other through both of their respective ends with curve segments which are convexly protruded outward, in at least one of said two shield layers and said magnetic pole layer with larger width in the track width direction.

15. The head gimbal assembly as claimed in claim 11, wherein the front surface has a quadrilateral shape with four rounded corners.

16. The head gimbal assembly as claimed in claim 11, wherein each of said edges corresponding to both side surfaces is a curve segment in which, as a point on the curve segment becomes more distant from the straight edge, the slope of the curve segment at the point becomes larger with respect to the straight edge.

17. The head gimbal assembly as claimed in claim 11, wherein each of said edges corresponding to both side surfaces is a straight line segment.

18. The head gimbal assembly as claimed in claim 11, wherein at least one of said two shield layers has a shape in which: each of edges corresponding to both side surfaces, obtained when viewed down from the position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and wherein, in each of said two shield layers, the front surface reaching the head end surface and a surface parallel to the element formation surface and on a side sandwiching said MR multilayer form a right or a substantially right angle.

19. The head gimbal assembly as claimed in claim 11, wherein said magnetic pole layer with larger width in the track width direction has a shape in which: each of edges corresponding to both side surfaces, obtained when viewed down from a the position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and wherein, in said magnetic pole layer with larger width in the track width direction, the front surface reaching the head end surface and a surface parallel to the element formation surface and on a side opposed to the other magnetic pole layer form a right or a substantially right angle.

20. The head gimbal assembly as claimed in claim 11, wherein, in at least one of said two shield layers and said magnetic pole layer with larger width in the track width direction, a layer surface near both ends in the track width direction, at which a magnetic flux is generally likely to be concentrated due to application of external magnetic field or write field and unwanted writing or erasing is likely to occur, is a surface without right or sharp angles.

21. A magnetic recording and reproducing apparatus comprising:
at least one head gimbal assembly comprising a thin-film magnetic head and a support means for supporting said thin-film magnetic head;
at least one magnetic recording medium, and
a recording/reproducing means for controlling read and write operations of said thin-film magnetic head to said at least one magnetic recording medium,
said thin-film magnetic head comprising:
a substrate having an air bearing surface;
a magnetoresistive element for reading data, formed on/above an element formation surface of said substrate, and comprising two shield layers provided so as to sandwich a magnetoresistive multilayer therebetween; and
an electromagnetic transducer for writing data, formed on/above the element formation surface of said substrate, and comprising two magnetic pole layers as magnetic paths for guiding a magnetic flux excited by a write current flowing through a write coil layer,
each of front surfaces of said two shield layers and said two magnetic pole layers, reaching a head end surface on an air bearing surface side,
at least one of said two shield layers and a magnetic pole layer with a larger width in a track width direction near the head end surface out of said two magnetic pole layers having a shape in which: each of edges corresponding to both side surfaces, obtained when viewed down from a position directly above the element formation surface, extends so as to spread obliquely rearward with each other from an end of a straight edge in the track width direction corresponding to the front surface; and the front surface reaching the head end surface has a shape in which upper and lower corner portions in each of both end portions in the track width direction form obtuse angles or rounded shapes, and
said head gimbal assembly further comprising signal lines for said magnetoresistive element and said electromagnetic transducer.

22. The magnetic recording and reproducing apparatus as claimed in claim 21, wherein the front surface has a shape in which there are an upper straight edge and a lower straight edge, and the upper and lower straight edges are connected to each other through both of their respective ends with curve segments which are convexly protruded outward.

23. The magnetic recording and reproducing apparatus as claimed in claim 21, wherein a cross-section near the head end surface taken by a plane parallel to the head end surface has a shape in which upper and lower corner portions in each of both end portions in the track width direction form obtuse angles or rounded shapes, in at least one of said two shield layers and said magnetic pole layer with larger width in the track width direction.

24. The magnetic recording and reproducing apparatus as claimed in claim 23, wherein a cross-section near the head end surface taken by a plane parallel to the head end surface has a shape in which there are an upper straight edge and a lower straight edge, and the upper and lower straight edges are connected to each other through both of their respective ends with curve segments which are convexly protruded outward, in at least one of said two shield layers and said magnetic pole layer with larger width in the track width direction.

25. The magnetic recording and reproducing apparatus as claimed in claim 21, wherein the front surface has a quadrilateral shape with four rounded corners.

26. The magnetic recording and reproducing apparatus as claimed in claim 21, wherein each of said edges corresponding to both side surfaces is a curve segment in which, as a point on the curve segment becomes more distant from the straight edge, the slope of the curve segment at the point becomes larger with respect to the straight edge.

27. The magnetic recording and reproducing apparatus as claimed in claim 21, wherein each of said edges corresponding to both side surfaces is a straight line segment.

28. The magnetic recording and reproducing apparatus as claimed in claim 21, wherein at least one of said two shield layers has a shape in which: each of edges corresponding to both side surfaces, obtained when viewed down from the position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and wherein, in each of said two shield layers, the front surface reaching the head end surface and a surface parallel to the element formation surface and on a side sandwiching said MR multilayer form a right or a substantially right angle.

29. The magnetic recording and reproducing apparatus as claimed in claim 21, wherein said magnetic pole layer with larger width in the track width direction has a shape in which: each of edges corresponding to both side surfaces, obtained when viewed down from the position directly above the element formation surface, extends so as to spread obliquely rearward with each other from an end of the straight edge in the track width direction corresponding to the front surface; and the front surface reaching the head end surface has a shape in which upper and lower corner portions in each of both end portions in the track width direction form obtuse angles or rounded shapes, and wherein, in said magnetic pole layer with larger width in the track width direction, the front surface reaching the head end surface and a surface parallel to the element formation surface and on a side opposed to the other magnetic pole layer form a right or a substantially right angle.

30. The magnetic recording and reproducing apparatus as claimed in claim 21, wherein, in at least one of said two shield layers and said magnetic pole layer with larger width in the track width direction, a layer surface near both ends in the track width direction, at which a magnetic flux is generally likely to be concentrated due to application of external magnetic field or write field and unwanted writing or erasing is likely to occur, is a surface without right or sharp angles.

* * * * *